United States Patent
Hack

(10) Patent No.: US 10,766,319 B2
(45) Date of Patent: Sep. 8, 2020

(54) CHAIN HOLDER

(71) Applicant: GR Innovations LLC, Waterford, MI (US)

(72) Inventor: Gregory D. Hack, Waterford, MI (US)

(73) Assignee: GR Innovations LLC, Waterford, MI (US)

( * ) Notice: Subject to any disclaimer, the term of this patent is extended or adjusted under 35 U.S.C. 154(b) by 94 days.

(21) Appl. No.: 15/898,881

(22) Filed: Feb. 19, 2018

(65) Prior Publication Data

US 2018/0257444 A1 Sep. 13, 2018

Related U.S. Application Data

(63) Continuation-in-part of application No. 29/596,720, filed on Mar. 10, 2017, now Pat. No. Des. 820,069.

(51) Int. Cl.

| B60D 1/18 | (2006.01) |
|---|---|
| B60D 1/06 | (2006.01) |
| B60D 1/28 | (2006.01) |
| B60D 1/52 | (2006.01) |
| B60D 1/58 | (2006.01) |

(52) U.S. Cl.
CPC ............ B60D 1/187 (2013.01); B60D 1/06 (2013.01); B60D 1/28 (2013.01); B60D 1/52 (2013.01); B60D 1/58 (2013.01)

(58) Field of Classification Search
CPC ... B60D 1/00; B60D 1/06; B60D 1/18; B60D 1/187; B60D 1/28; B60D 1/52; B60D 1/58
See application file for complete search history.

(56) References Cited

U.S. PATENT DOCUMENTS

| 388,384 A | | 8/1888 | Woodworth | |
|---|---|---|---|---|
| 1,585,840 A | * | 5/1926 | Fahnestock | H01R 4/4845 248/74.2 |
| D168,074 S | | 10/1952 | Symington | |
| 2,937,885 A | * | 5/1960 | Skow | B60D 1/28 280/457 |
| 2,998,982 A | | 9/1961 | Brazil | |
| 3,125,355 A | * | 3/1964 | Snuggins | B60D 1/28 24/116 R |
| 3,132,878 A | | 5/1964 | De Puydt | |
| 3,441,291 A | * | 4/1969 | Morris, Jr. | B60D 1/065 280/406.2 |
| 3,484,069 A | | 12/1969 | Larson | |

(Continued)

*Primary Examiner* — Jacob D Knutson
*Assistant Examiner* — Maurice L Williams
(74) *Attorney, Agent, or Firm* — Fishman Stewart PLLC

(57) ABSTRACT

A chain holder includes a first portion, a second portion, a third portion connecting the first portion with the third portion, a first hook portion extending from the first portion, and a second hook portion extending from the second portion. The first portion and the second portion may be disposed substantially in parallel with each other. The third portion may be disposed substantially perpendicular to the first portion and the second portion. A chain holder may include a first projection and a second projection. The first projection may extend inward from the first portion and the second projection may extend inward from the second portion. The first projection and the second projection may be substantially aligned with each other. A distance from the first projection to the third portion corresponds to a height of a trailer assembly component.

17 Claims, 30 Drawing Sheets

(56) References Cited

U.S. PATENT DOCUMENTS

| | | | |
|---|---|---|---|
| 3,565,379 A | 2/1971 | Messier et al. | |
| 3,621,651 A * | 11/1971 | Gillespie | F16G 15/02 |
| | | | 59/85 |
| 3,649,049 A | 3/1972 | Woodke, III | |
| 3,739,432 A * | 6/1973 | Sander | B60D 1/167 |
| | | | 24/582.13 |
| 3,806,161 A * | 4/1974 | Pollart | B60D 1/06 |
| | | | 280/500 |
| 3,827,722 A | 8/1974 | Miller et al. | |
| 4,248,469 A * | 2/1981 | Knox | B66C 1/14 |
| | | | 294/82.12 |
| 4,405,147 A * | 9/1983 | Horsman | B60D 1/06 |
| | | | 280/442 |
| D319,002 S * | 8/1991 | Mirza | D8/372 |
| 5,087,007 A * | 2/1992 | Gaderick | A47G 25/0692 |
| | | | 248/108 |
| D324,735 S | 3/1992 | Collister et al. | |
| 5,174,550 A | 12/1992 | Pittman | |
| 5,362,084 A | 11/1994 | Edwards | |
| 5,755,477 A * | 5/1998 | McKnight | A45F 5/10 |
| | | | 294/146 |
| 5,765,850 A * | 6/1998 | Emerson | B60D 1/46 |
| | | | 280/490.1 |
| 5,881,982 A | 3/1999 | Hollingsworth et al. | |
| 5,918,896 A | 7/1999 | Jenkins, Jr. | |
| 6,179,317 B1 | 1/2001 | Hurst et al. | |
| 6,279,939 B1 | 8/2001 | Austin | |
| 6,302,365 B1 * | 10/2001 | Catanzarite | A47G 25/0614 |
| | | | 248/215 |
| 6,463,686 B1 * | 10/2002 | Eisenbraun | B60D 1/60 |
| | | | 280/507 |
| 6,644,679 B1 | 11/2003 | Warren | |
| 6,712,379 B2 * | 3/2004 | Graham | B60D 1/00 |
| | | | 211/18 |
| 6,832,775 B1 * | 12/2004 | Muller | B60D 1/605 |
| | | | 280/507 |
| 6,948,752 B1 * | 9/2005 | Crow | B66C 1/125 |
| | | | 294/82.11 |
| 7,207,088 B2 * | 4/2007 | Adams | A47G 25/0614 |
| | | | 16/404 |
| D542,126 S | 5/2007 | Ernst et al. | |
| 7,815,210 B1 * | 10/2010 | Pennal | B60D 1/56 |
| | | | 280/457 |
| 8,025,258 B2 | 9/2011 | Eldridge | |
| 8,235,410 B2 | 8/2012 | Weber et al. | |
| D689,702 S | 9/2013 | Levin et al. | |
| D700,044 S | 2/2014 | Goodman et al. | |
| D702,112 S | 4/2014 | Cittadino et al. | |
| 8,733,779 B2 | 5/2014 | Arakelian | |
| D712,729 S | 9/2014 | Cushing | |
| 8,882,132 B2 * | 11/2014 | McCoy | B60D 1/187 |
| | | | 280/457 |
| 8,955,864 B2 | 2/2015 | Palen et al. | |
| 9,004,520 B2 | 4/2015 | Madison | |
| 9,079,465 B1 | 7/2015 | Sanftleben et al. | |
| D771,805 S | 11/2016 | Brooker | |
| D773,836 S | 12/2016 | Eads | |
| D796,939 S | 9/2017 | Julian | |
| 9,963,079 B2 * | 5/2018 | Hack | B60R 9/06 |
| 2005/0039309 A1 | 2/2005 | McCauley et al. | |
| 2006/0006626 A1 * | 1/2006 | Scruggs | B60D 1/06 |
| | | | 280/495 |
| 2008/0184533 A1 * | 8/2008 | Kelly | B60D 1/18 |
| | | | 24/129 R |
| 2008/0238036 A1 | 10/2008 | Baum et al. | |
| 2008/0315554 A1 * | 12/2008 | Rightmire | B60D 1/00 |
| | | | 280/400 |
| 2009/0039615 A1 * | 2/2009 | Johnson | B60D 1/07 |
| | | | 280/416.1 |
| 2011/0221167 A1 * | 9/2011 | Merten | B60D 1/02 |
| | | | 280/504 |
| 2018/0135795 A1 * | 5/2018 | Palmer | F16M 13/02 |
| 2018/0178850 A1 * | 6/2018 | Schmeichel | B62D 25/163 |
| 2018/0297426 A1 * | 10/2018 | Najarro | B60D 1/187 |

\* cited by examiner

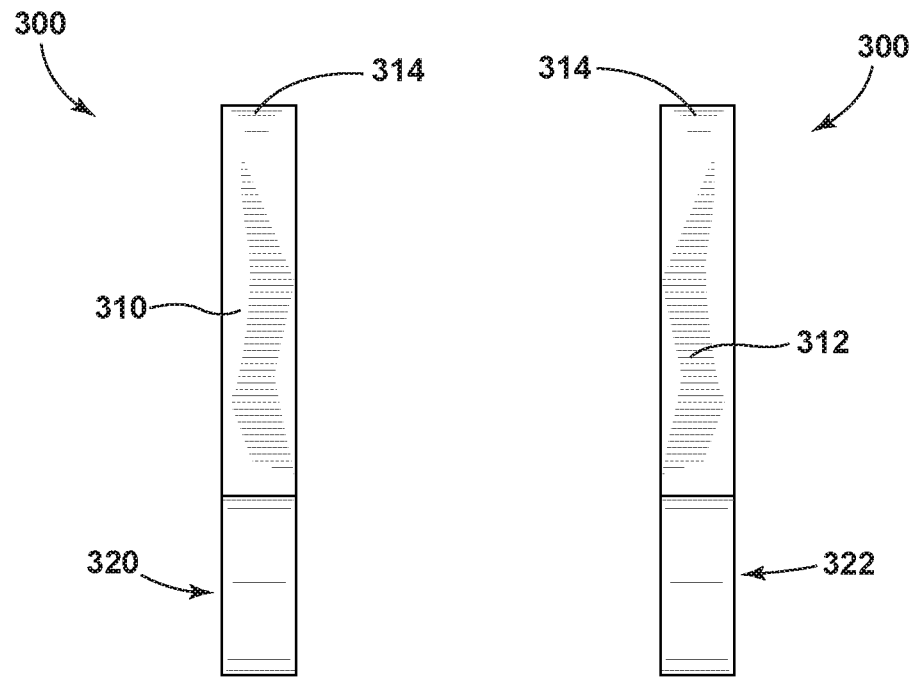
FIG. 22   FIG. 23
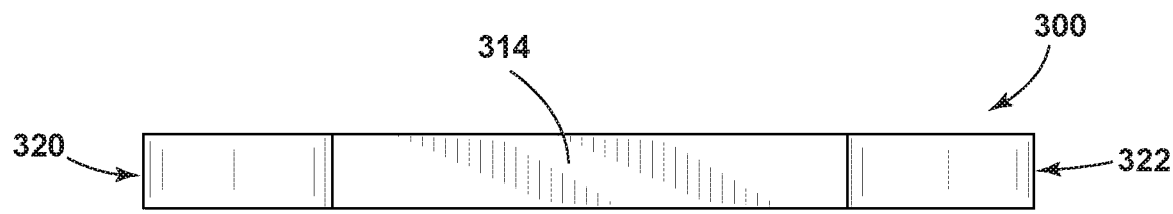
FIG. 24
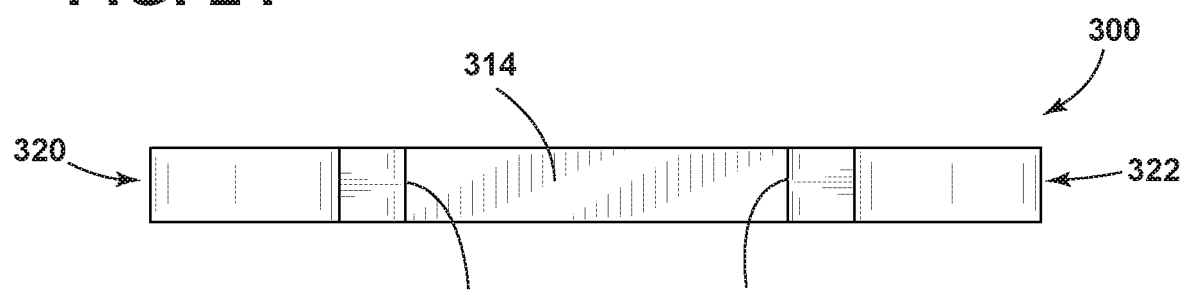
FIG. 25

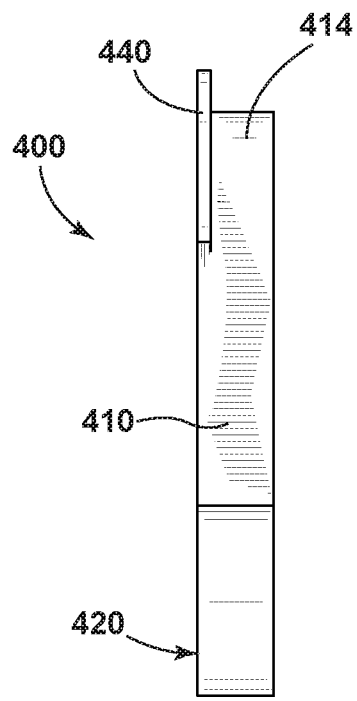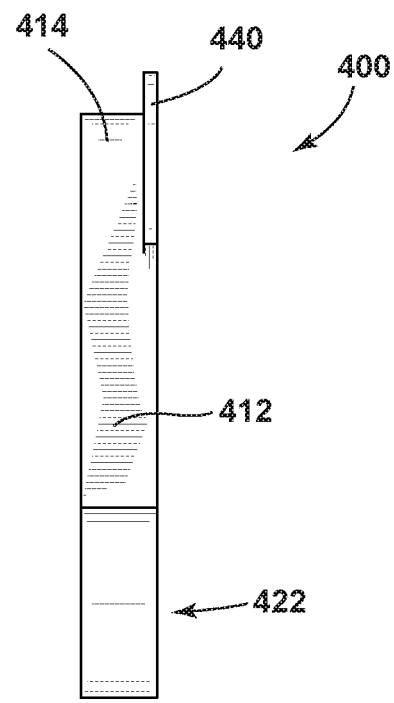
FIG. 30  FIG. 31
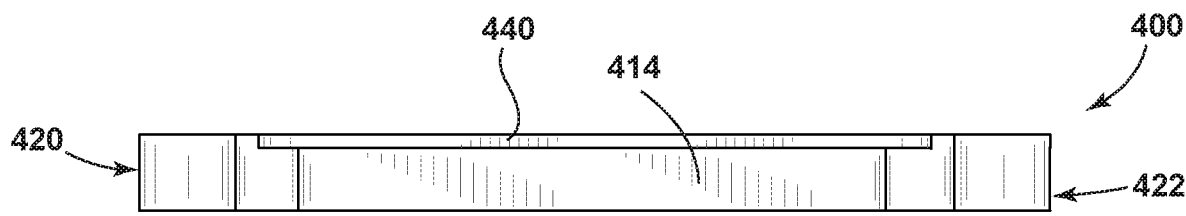
FIG. 32
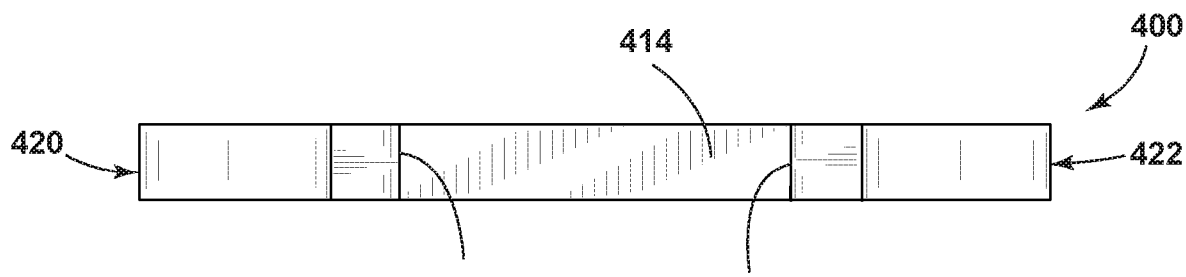
FIG. 33

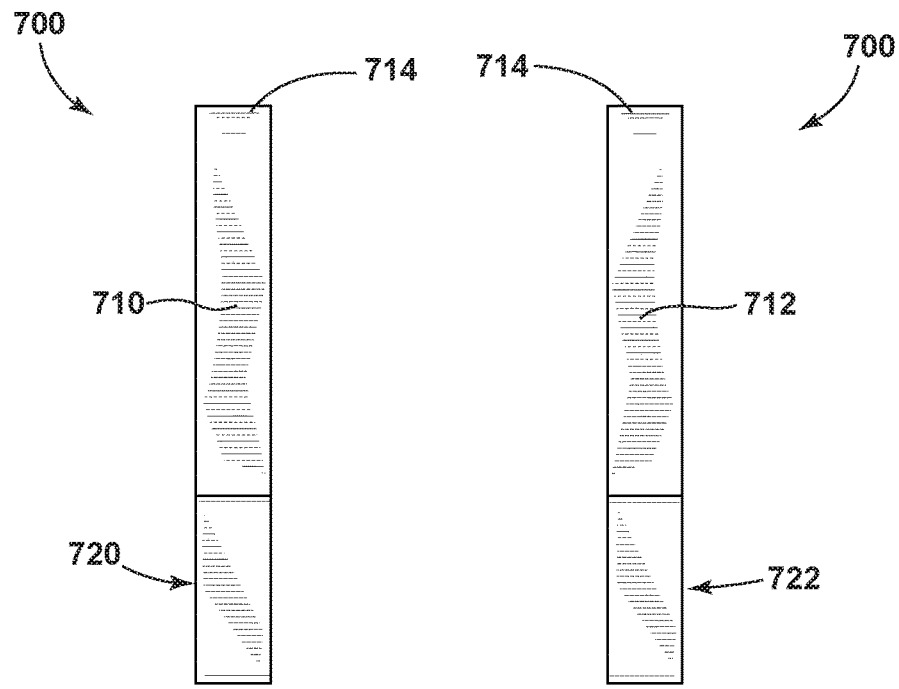
FIG. 52   FIG. 53
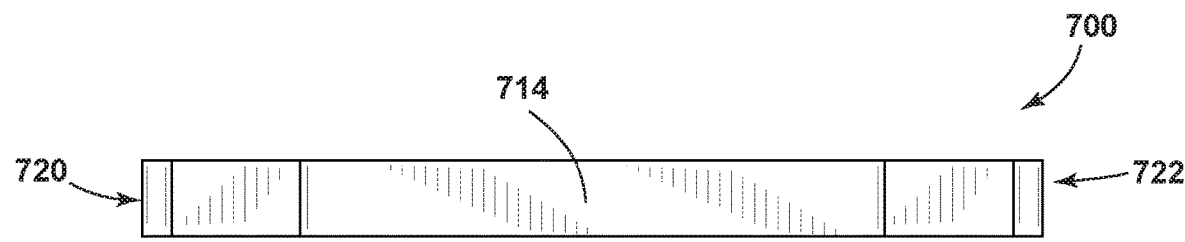
FIG. 54
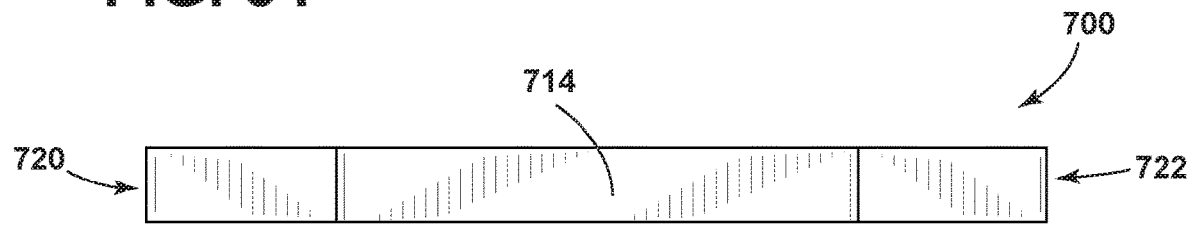
FIG. 55

CHAIN HOLDER

CROSS-REFERENCE TO RELATED APPLICATION

This application claims the benefit of U.S. Design patent application Ser. No. 29/596,720, filed on Mar. 10, 2017, the disclosure of which is hereby incorporated herein by reference in its entirety.

TECHNICAL FIELD

The present disclosure generally relates to chain holders, including chain holders that may be used in connection with trailers and/or vehicles.

BACKGROUND

This background description is set forth below for the purpose of providing context only. Therefore, any aspect of this background description, to the extent that it does not otherwise qualify as prior art, is neither expressly nor impliedly admitted as prior art against the instant disclosure.

Vehicles are often used to pull trailers. A primary connection between a trailer and a vehicle may be between a tongue of a trailer and a ball of a trailering assembly component of a vehicle. Some trailering assemblies may include one or more secondary connections, such as via one or more safety chains. In some circumstances, once connected, safety chains may hang lower than desired and can potentially drag on the ground, which may damage the safety chains.

There is a desire for solutions/options that minimize or eliminate one or more challenges or shortcomings of trailering assemblies. The foregoing discussion is intended only to illustrate examples of the present field and should not be taken as a disavowal of scope.

SUMMARY

In embodiments, A chain holder includes a first portion, a second portion, a third portion connecting the first portion with the third portion, a first hook portion extending from the first portion, and a second hook portion extending from the second portion. The first portion and the second portion may be disposed substantially in parallel with each other. The third portion may be disposed substantially perpendicular to the first portion and the second portion. A chain holder may include a first projection and a second projection. The first projection may extend inward from the first portion and the second projection may extend inward from the second portion. The first projection and the second projection may be substantially aligned with each other. A distance from the first projection to the third portion corresponds to a height of a trailer assembly component.

The foregoing and other aspects, features, details, utilities, and/or advantages of embodiments of the present disclosure will be apparent from reading the following description, and from reviewing the accompanying drawings.

BRIEF DESCRIPTION OF THE DRAWINGS

FIG. 22 is a left side view of the third embodiment.

FIG. 23 is a right side view of the third embodiment.

FIG. 24 is a top plan view of the third embodiment.

FIG. 25 is a bottom plan view of the third embodiment.

FIG. 30 is a left side view of the fourth embodiment.

FIG. 31 is a right side view of the fourth embodiment.

FIG. 32 is a top plan view of the fourth embodiment.

FIG. 33 is a bottom plan view of the fourth embodiment.

FIG. 52 is a left side view of the seventh embodiment.

FIG. 53 is a right side view of the seventh embodiment.

FIG. 54 is a top plan view of the seventh embodiment.

FIG. 55 is a bottom plan view of the seventh embodiment.

DETAILED DESCRIPTION

Reference will now be made in detail to embodiments of the present disclosure, examples of which are described herein and illustrated in the accompanying drawings. While the present disclosure will be described in conjunction with embodiments and/or examples, it will be understood that they are not intended to limit the present disclosure to these embodiments and/or examples. On the contrary, the present disclosure is intended to cover alternatives, modifications, and equivalents.

Figure 1:
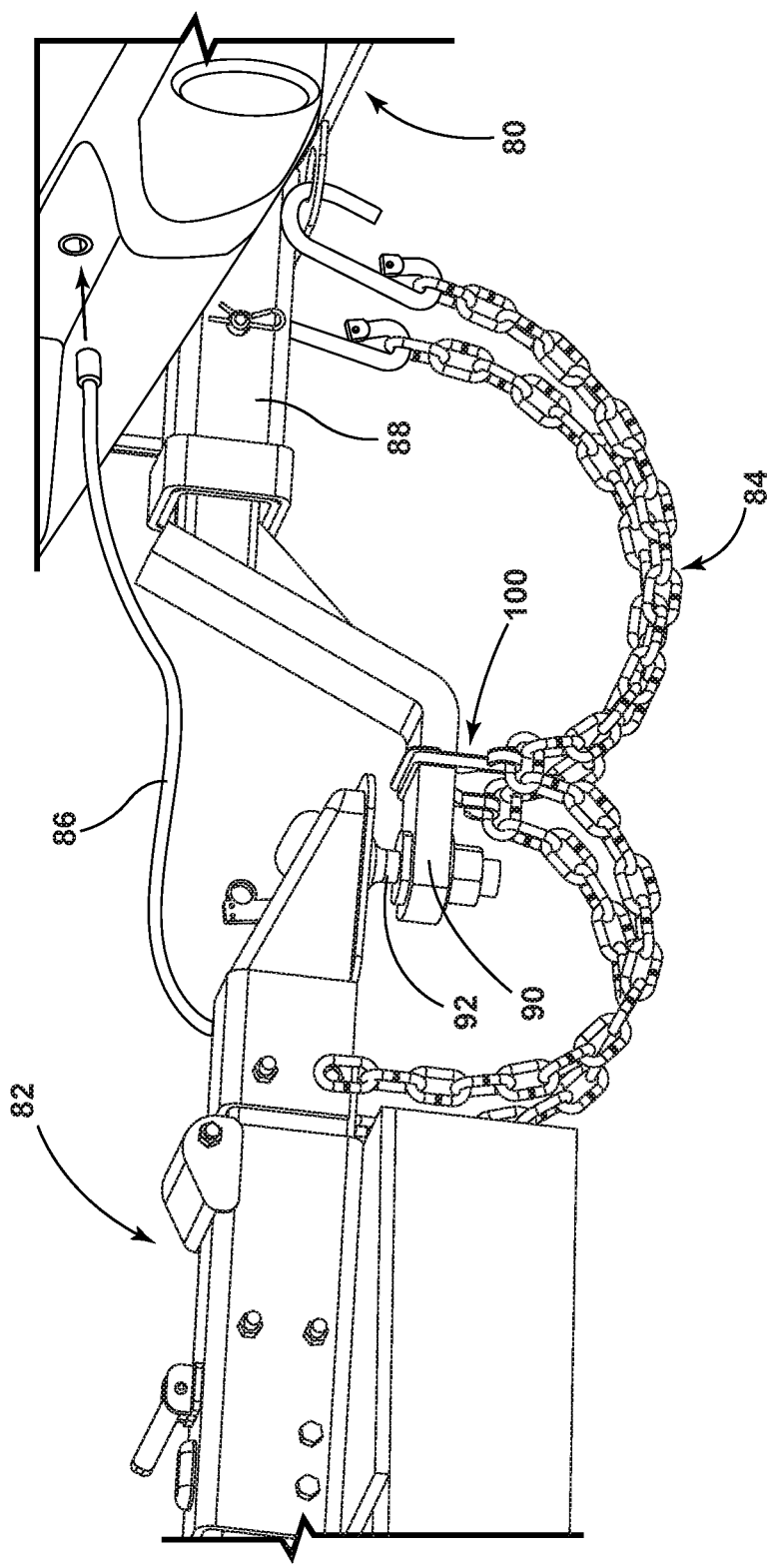
FIG. 1 is a front, top, right perspective view of an embodiment of a trailering assembly, including a trailer, a vehicle, and a chain holder according to teachings of the present disclosure.
Figure 2:
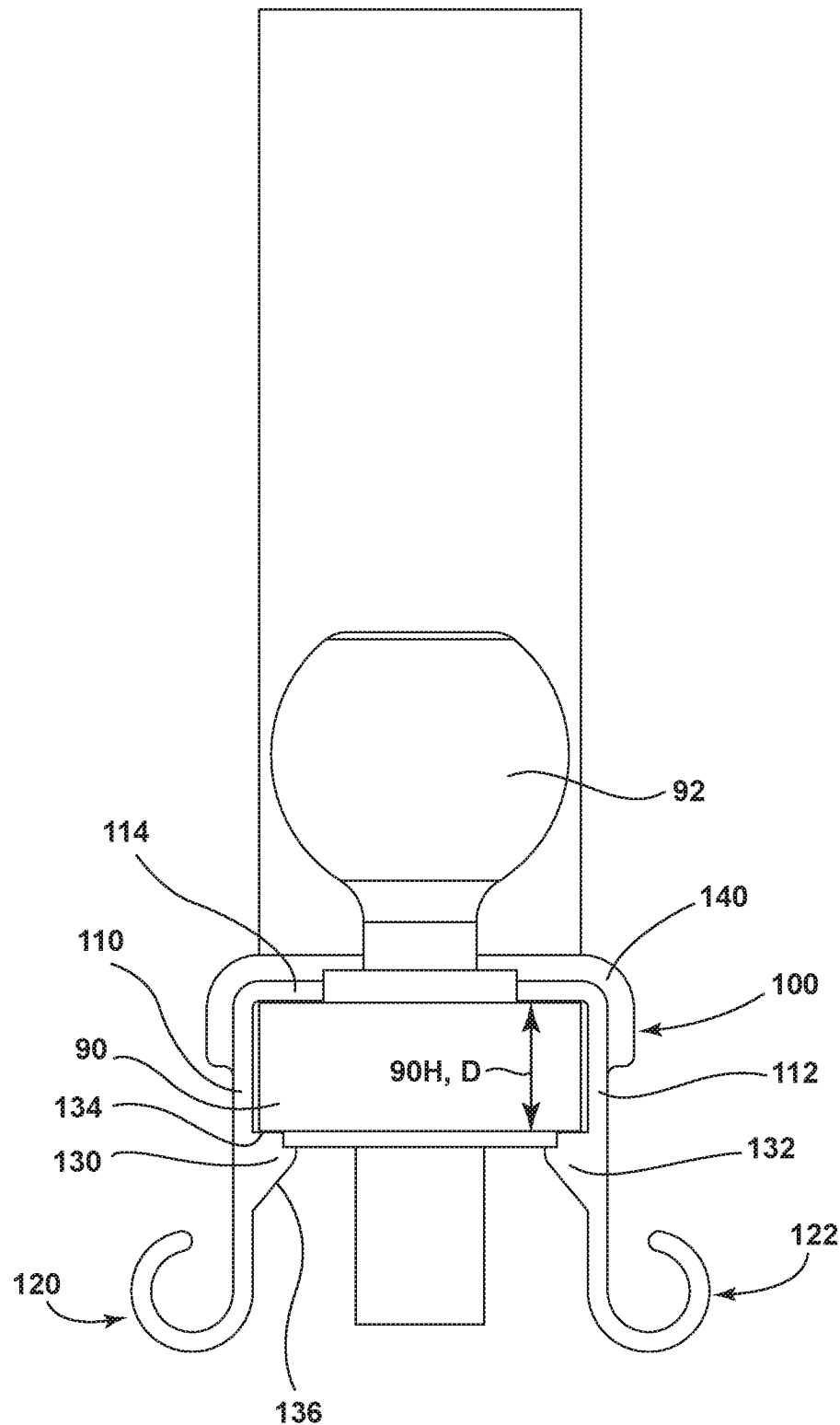
FIG. 2 is a front view of embodiments of a mounting arm, a ball, and a chain holder according to teachings of the present disclosure.
Figure 3:
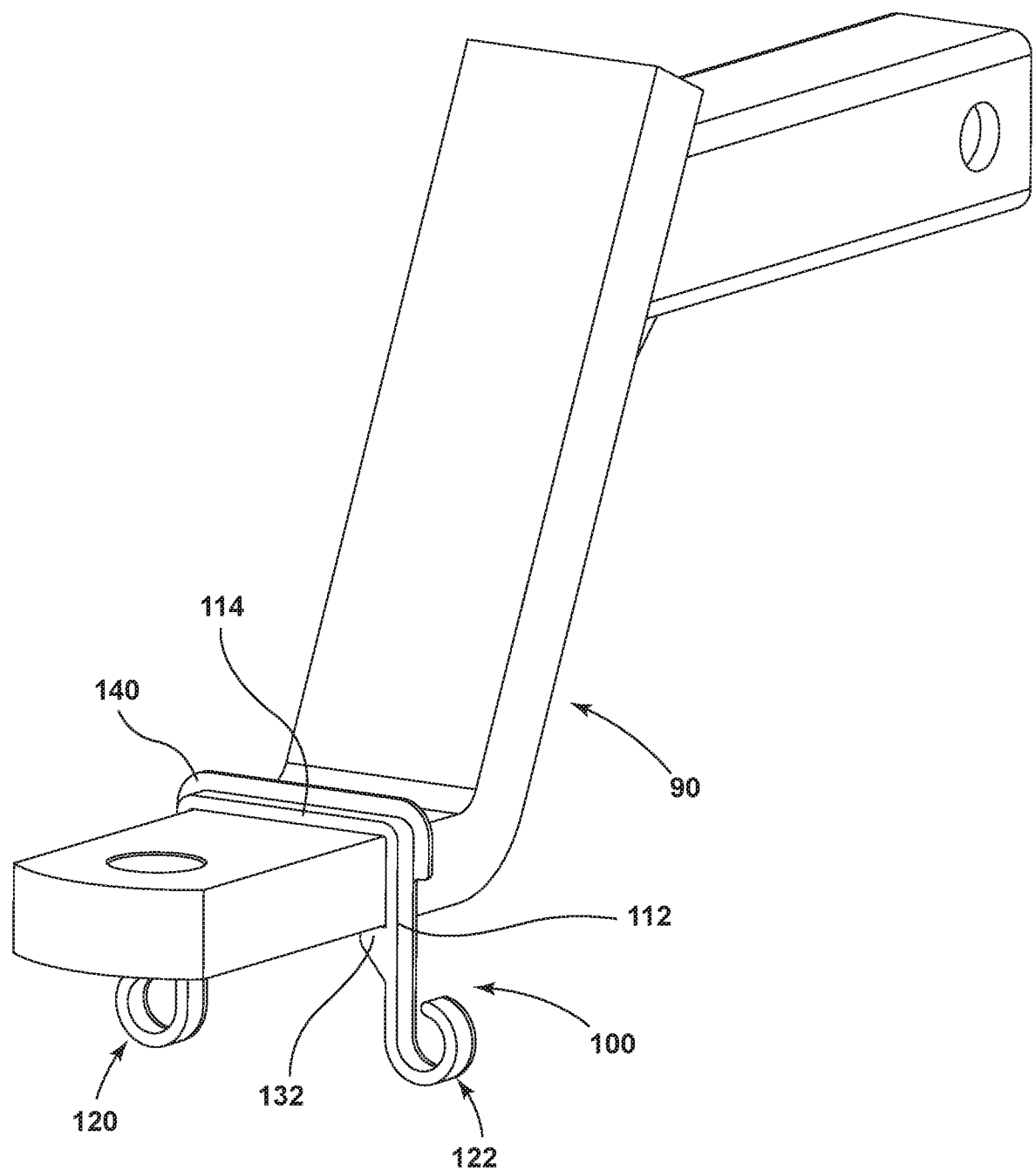
FIG. 3 is a front, top, right perspective view of embodiments of a trailer mount bar and a chain holder according to teachings of the present disclosure.

In embodiments, such as generally illustrated in FIGS. 1, 2, and 3, a chain holder (e.g., chain holder 100) may be utilized in connection with a vehicle 80 and/or an apparatus to be towed by a vehicle (e.g., a trailer 82). A chain holder 100 may be configured to hold (e.g., connect to, support, etc.) one or more chains 84 and/or connecting members 86 that may be connected to a trailer 82 and/or a vehicle 80. For example and without limitation, a chain holder 100 may be configured to hold one or more safety chains 84 of a trailer 82 that may be selectively connected to a vehicle 80. The chain(s) 84 may provide a supplemental or secondary connection between the trailer 82 and the vehicle 80. A chain holder 100 may be configured for connection with a vehicle 80, such as for example, with a mounting arm or bar 90 of the vehicle 80 connected with a trailer hitch 88 of the vehicle 80. A ball 92 may be connected to a mounting arm 90 and/or a primary connection between a trailer 82 and a vehicle 80 may include the trailer 82 engaging the ball 92.

Figure 4:
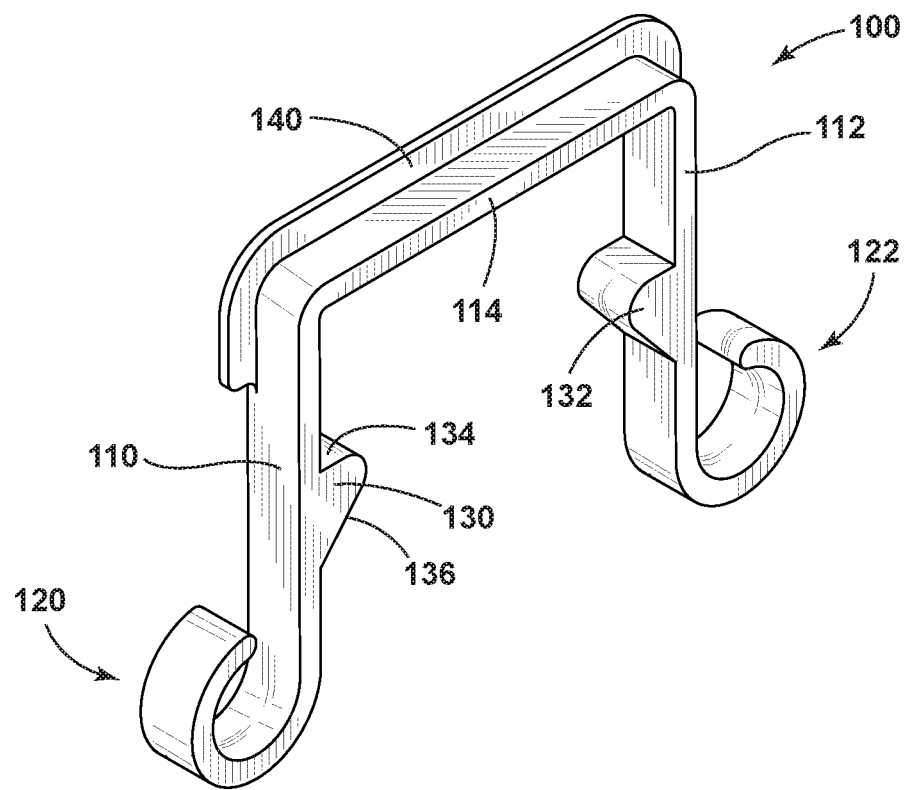
FIG. 4 is a front, top, left side perspective view of a first embodiment of a chain holder according to teachings of the present disclosure.
Figure 5:
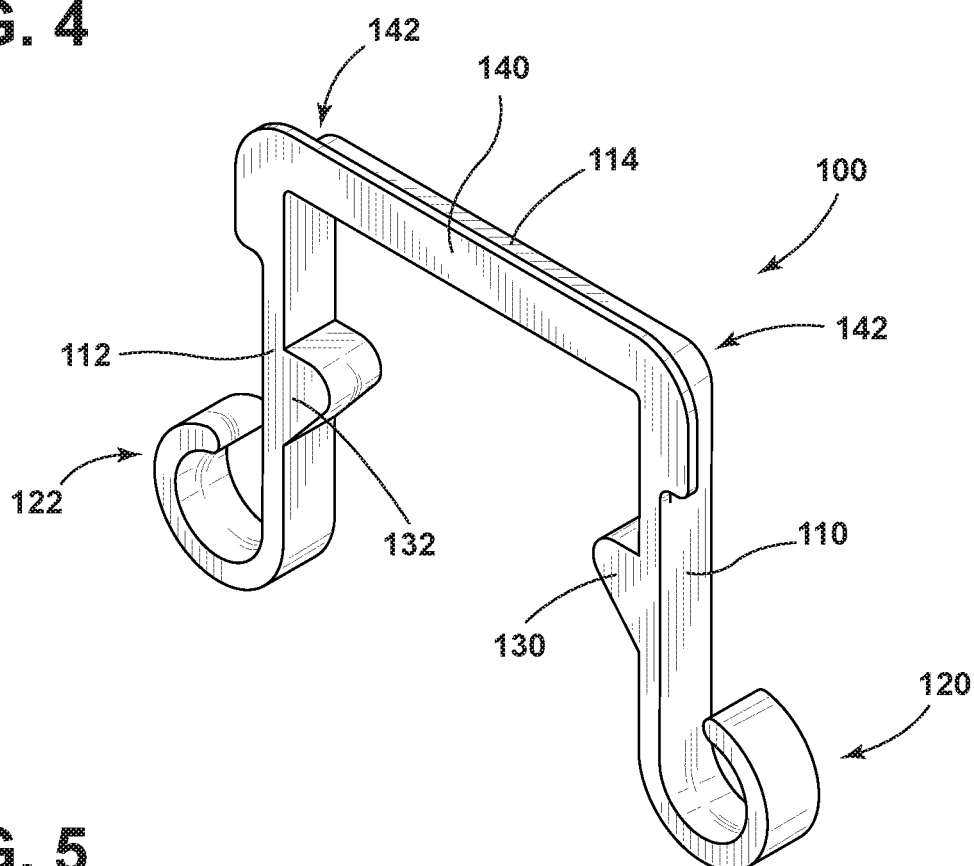
FIG. 5 is a rear, top, right side perspective view of a first embodiment of a chain holder according to teachings of the present disclosure.
Figure 6:
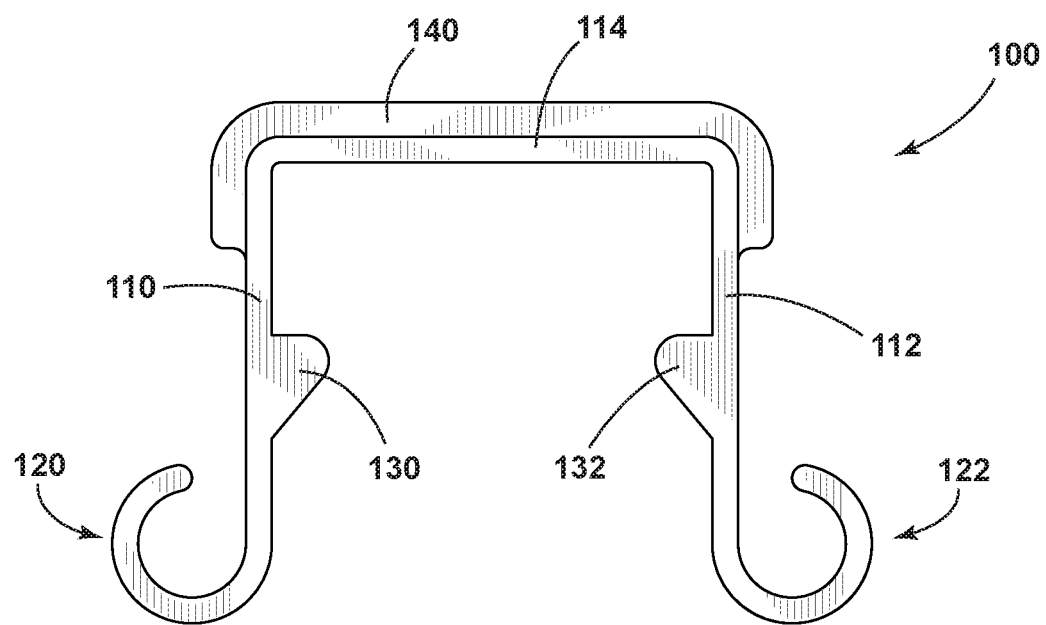
FIG. 6 is a front elevational view of the first embodiment.
Figure 7:
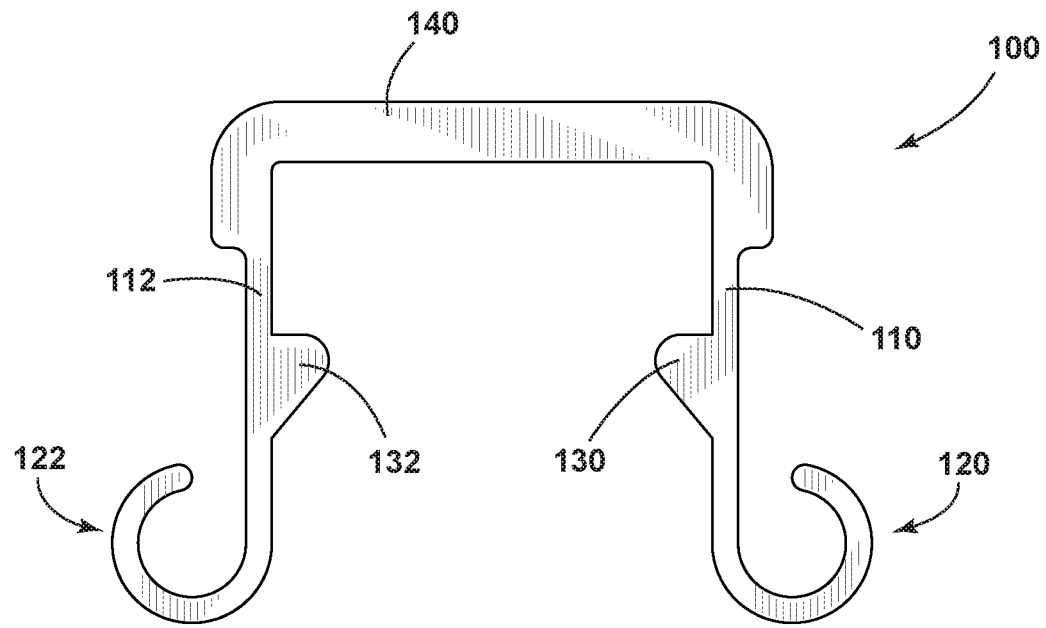
FIG. 7 is a rear elevational view of the first embodiment.
Figures 8, 9:
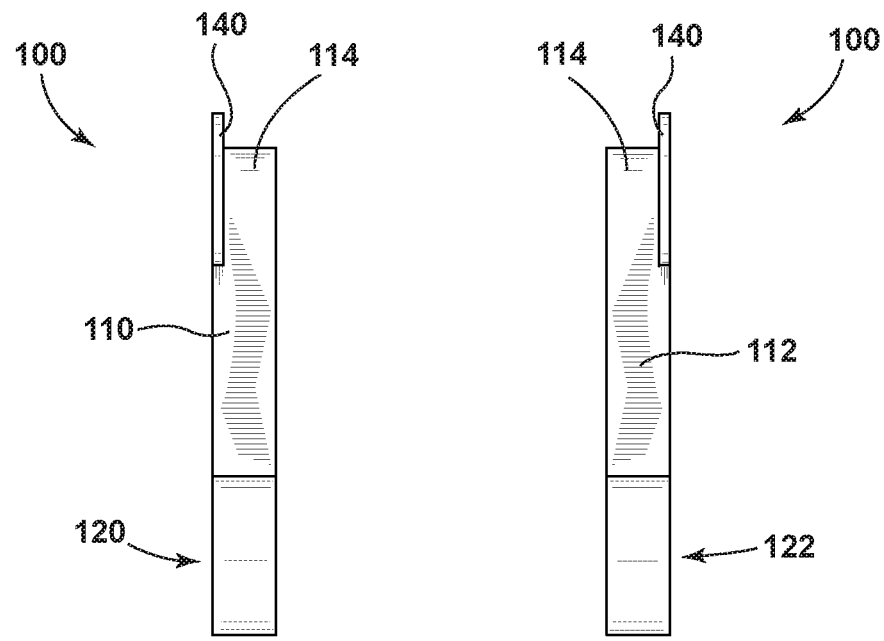
FIG. 8 is a left side view of the first embodiment.
FIG. 9 is a right side view of the first embodiment.
Figure 10:
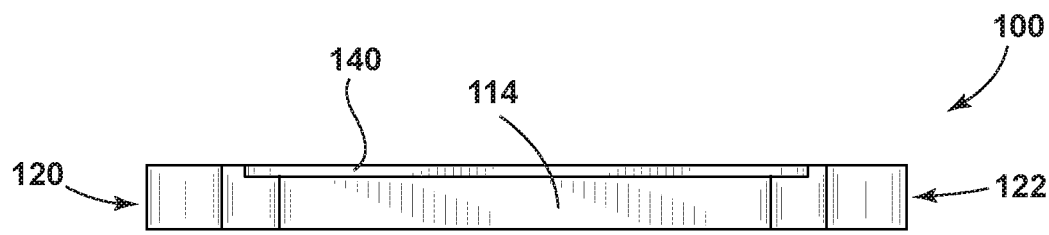
FIG. 10 is a top plan view of the first embodiment.
Figure 11:
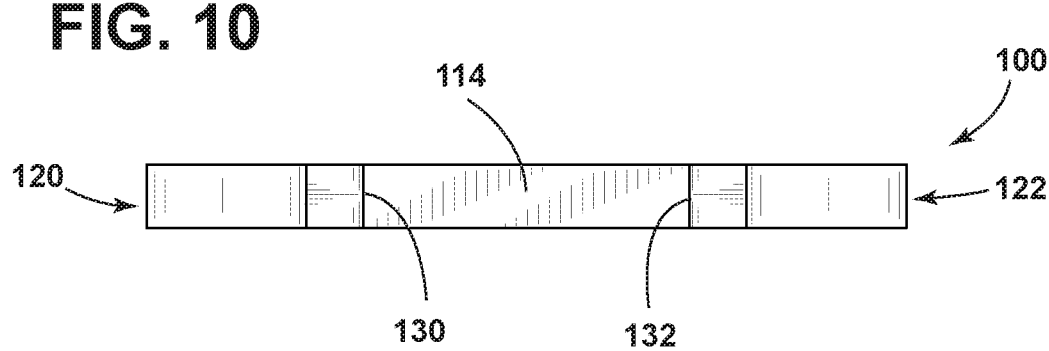
FIG. 11 is a bottom plan view of the first embodiment.
Figure 12:
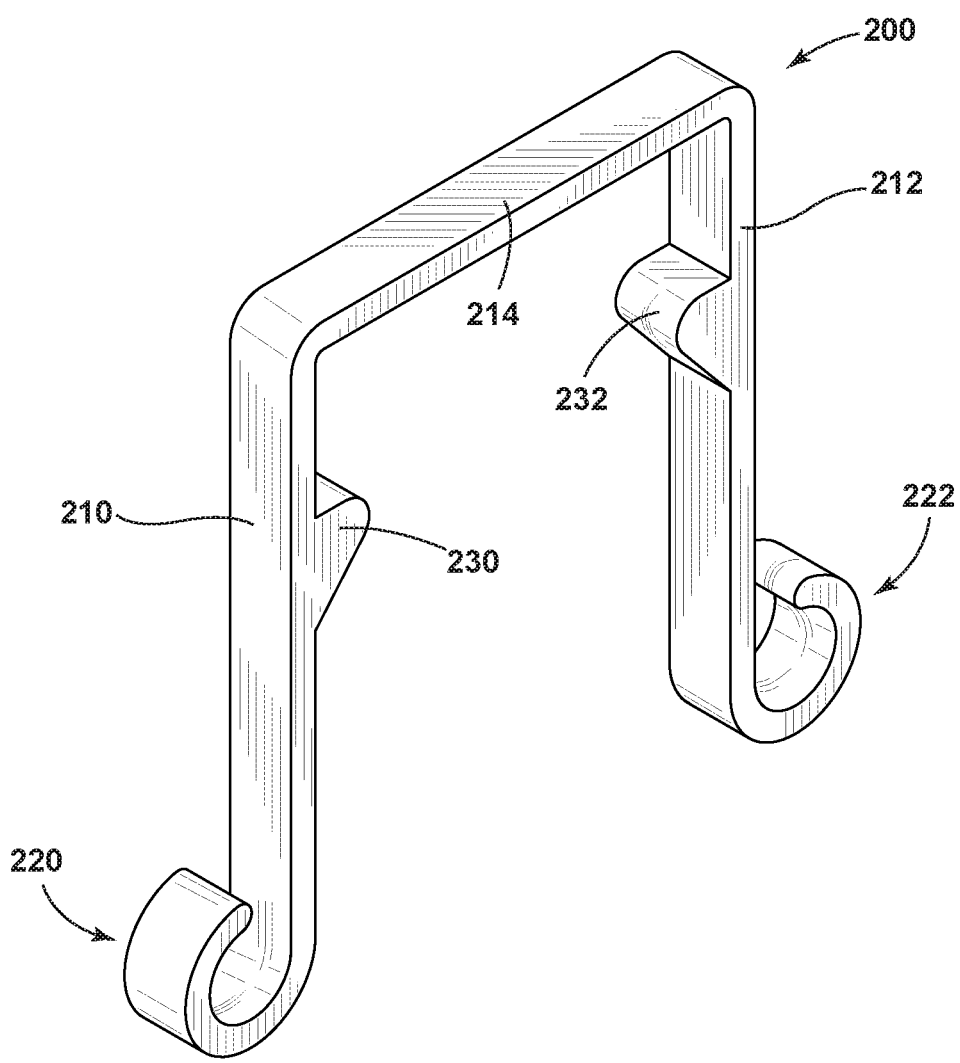
FIG. 12 is a front, top, left side perspective view of a second embodiment of a chain holder according to teachings of the present disclosure.
Figure 13:
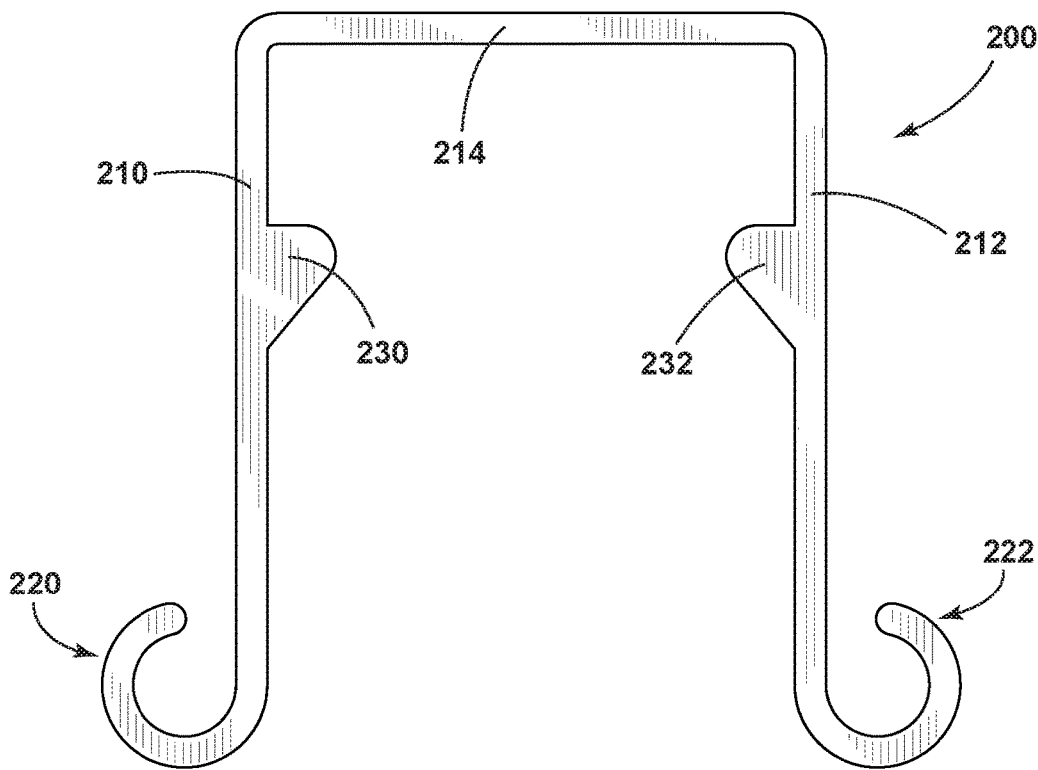
FIG. 13 is a front elevational view of the second embodiment.
Figure 14:
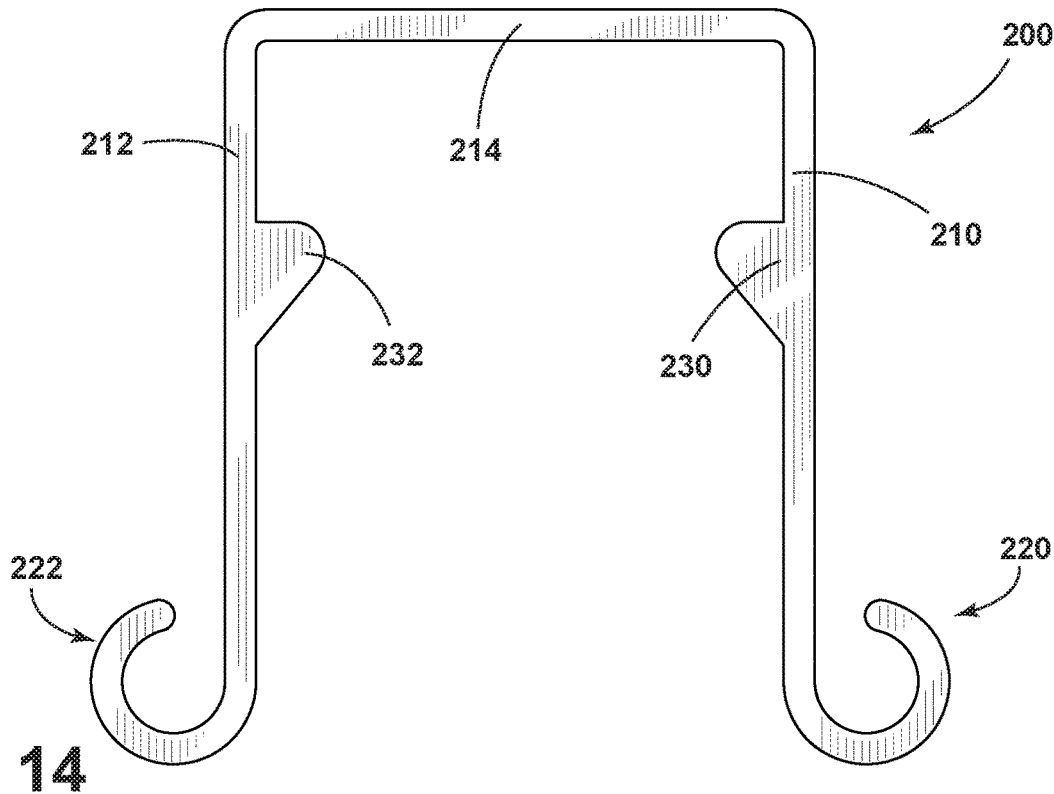
FIG. 14 is a rear elevational view of the second embodiment.
Figures 15, 16:
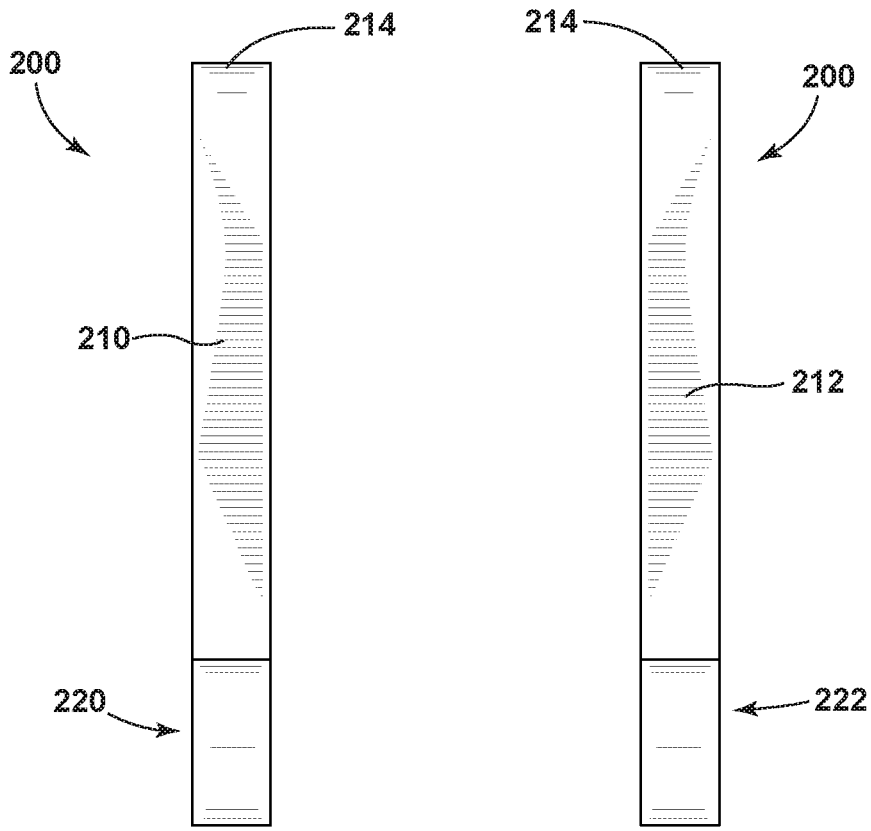
FIG. 15 is a left side view of the second embodiment.
FIG. 16 is a right side view of the second embodiment.
Figure 17:
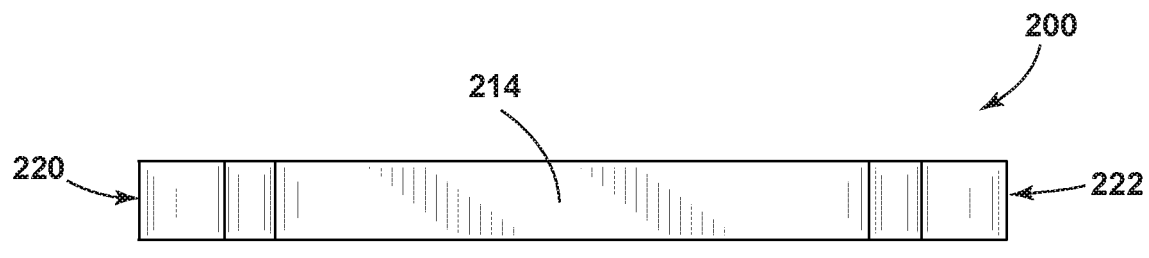
FIG. 17 is a top plan view of the second embodiment.
Figure 18:
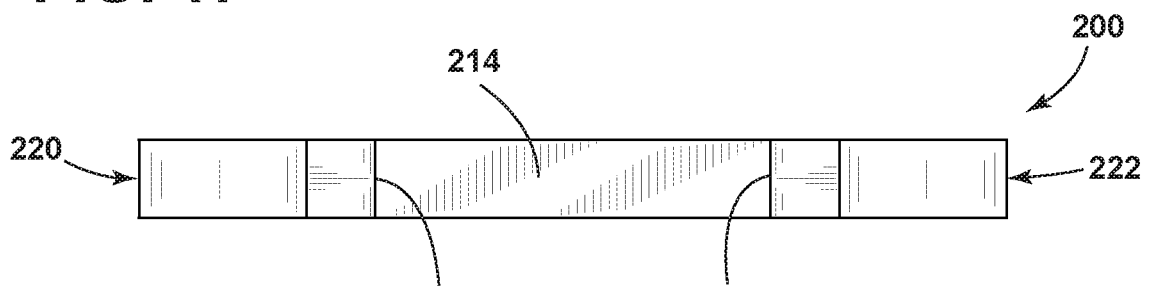
FIG. 18 is a bottom plan view of the second embodiment.
Figure 19:
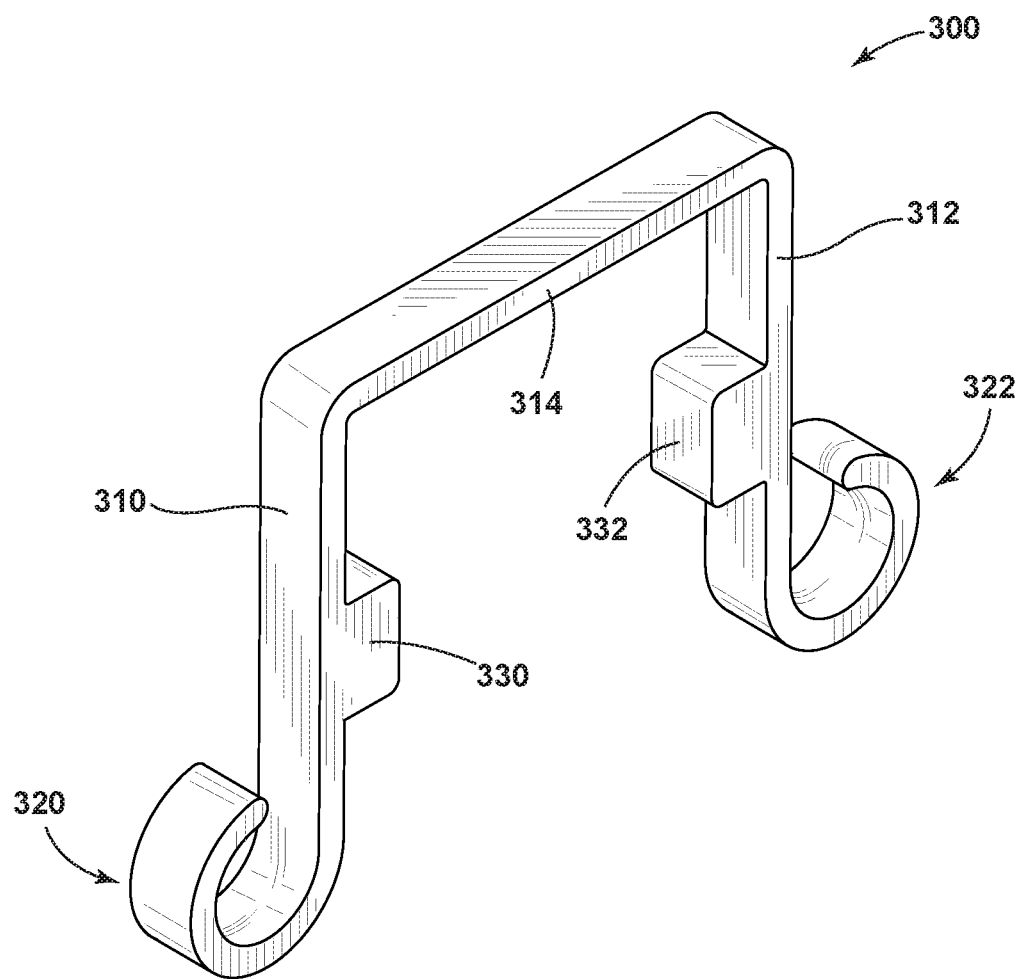
FIG. 19 is a front, top, left side perspective view of a third embodiment of a chain holder according to teachings of the present disclosure.
Figure 20:
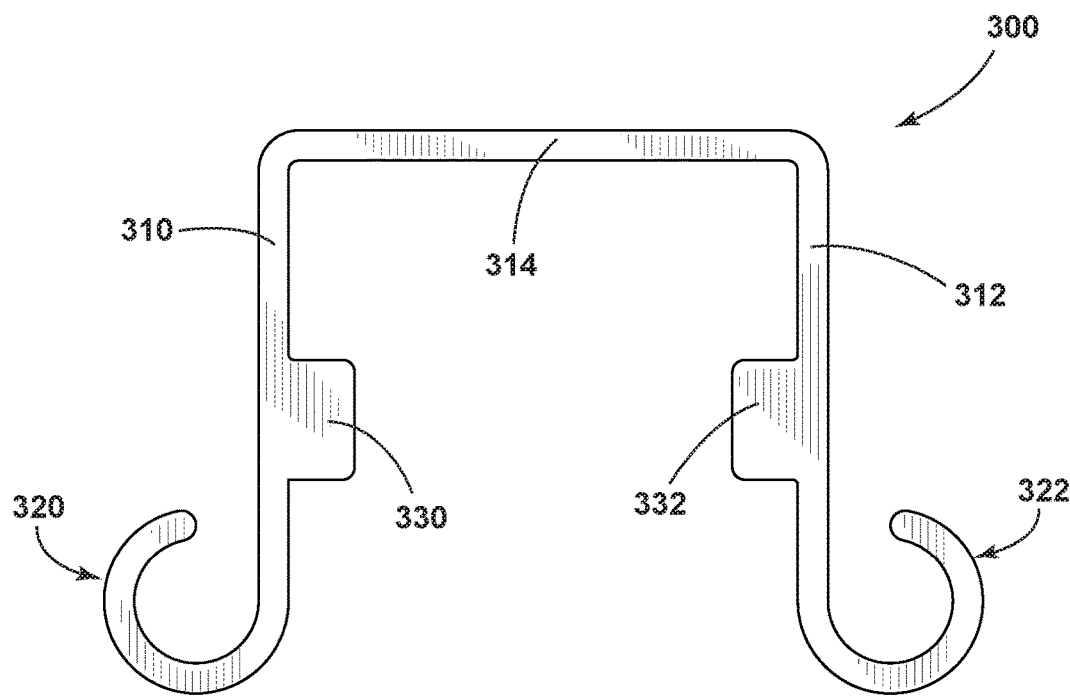
FIG. 20 is a front elevational view of the third embodiment.
Figure 21:
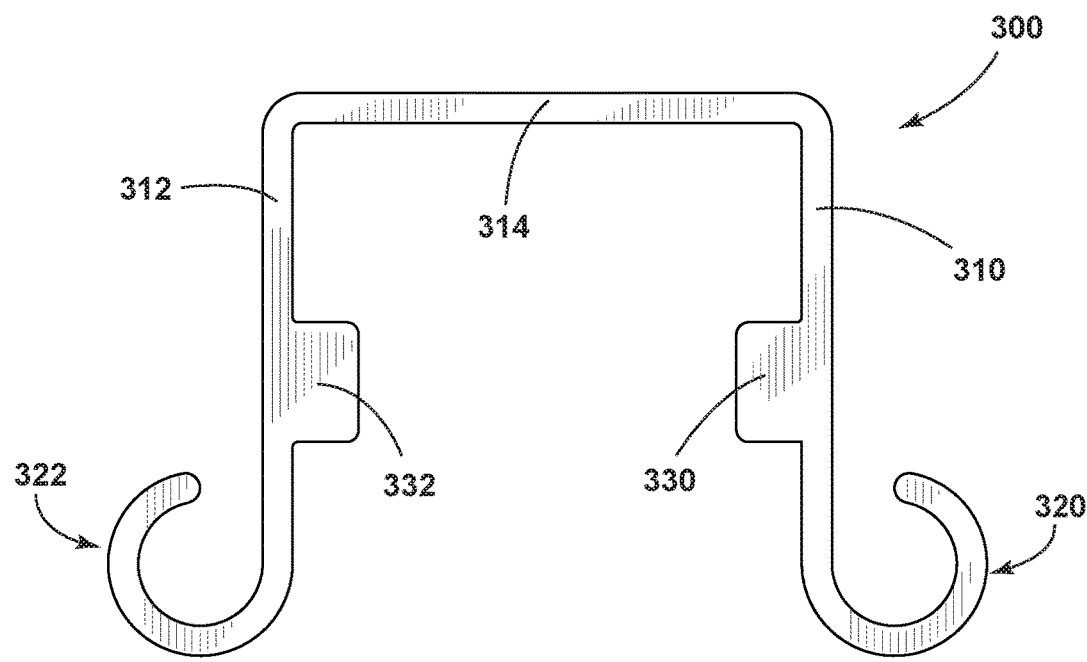
FIG. 21 is a rear elevational view of the third embodiment.
Figure 26:
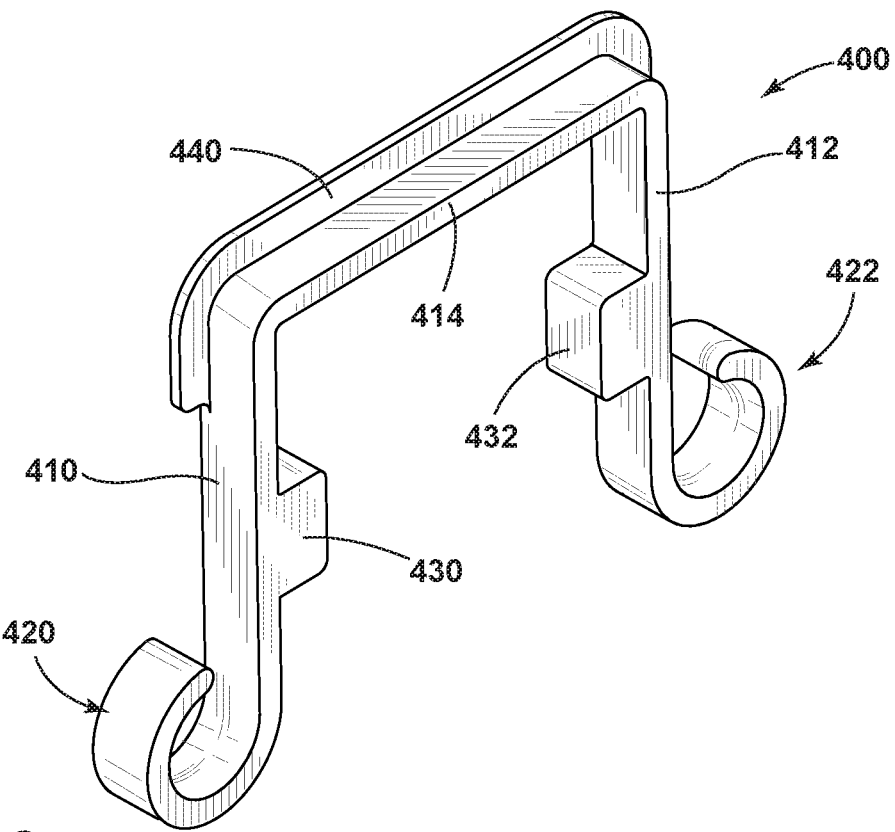
FIG. 26 is a front, top, left side perspective view of a fourth embodiments of a chain holder according to teachings of the present disclosure.
Figure 27:
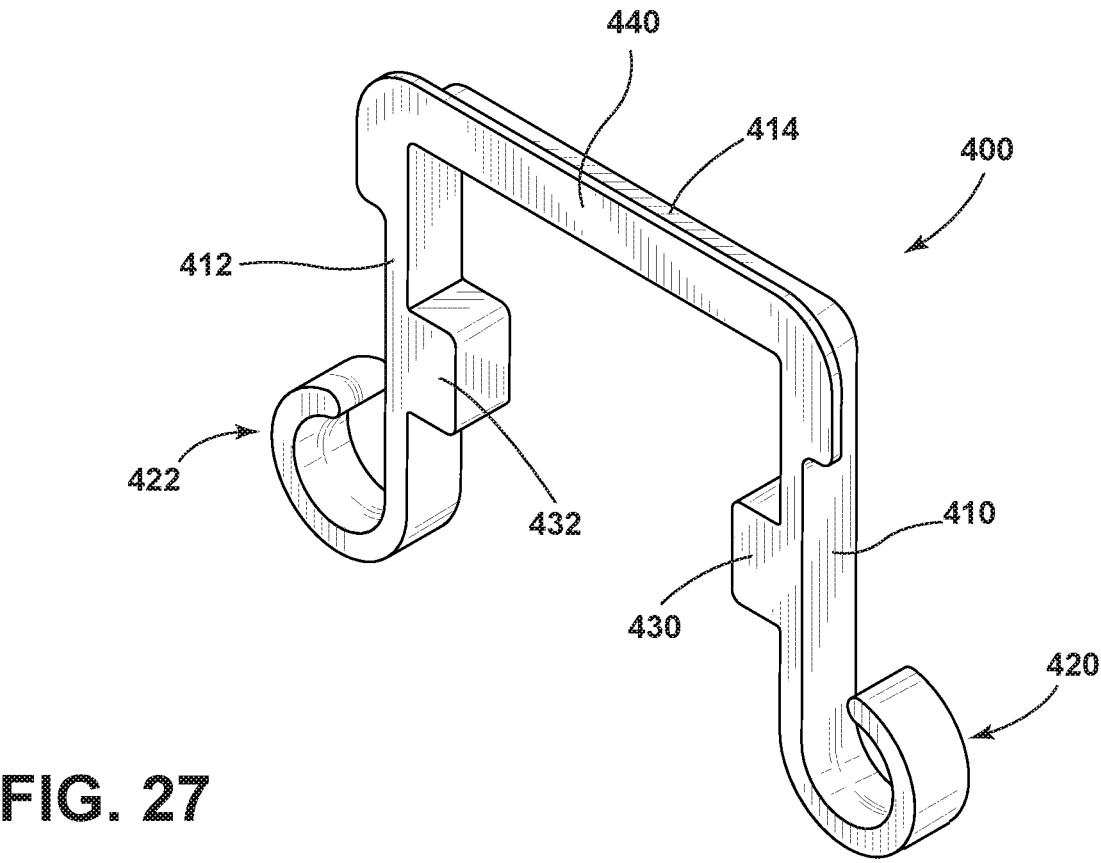
FIG. 27 is a rear, top, left side perspective view of the fourth embodiment.
Figure 28:
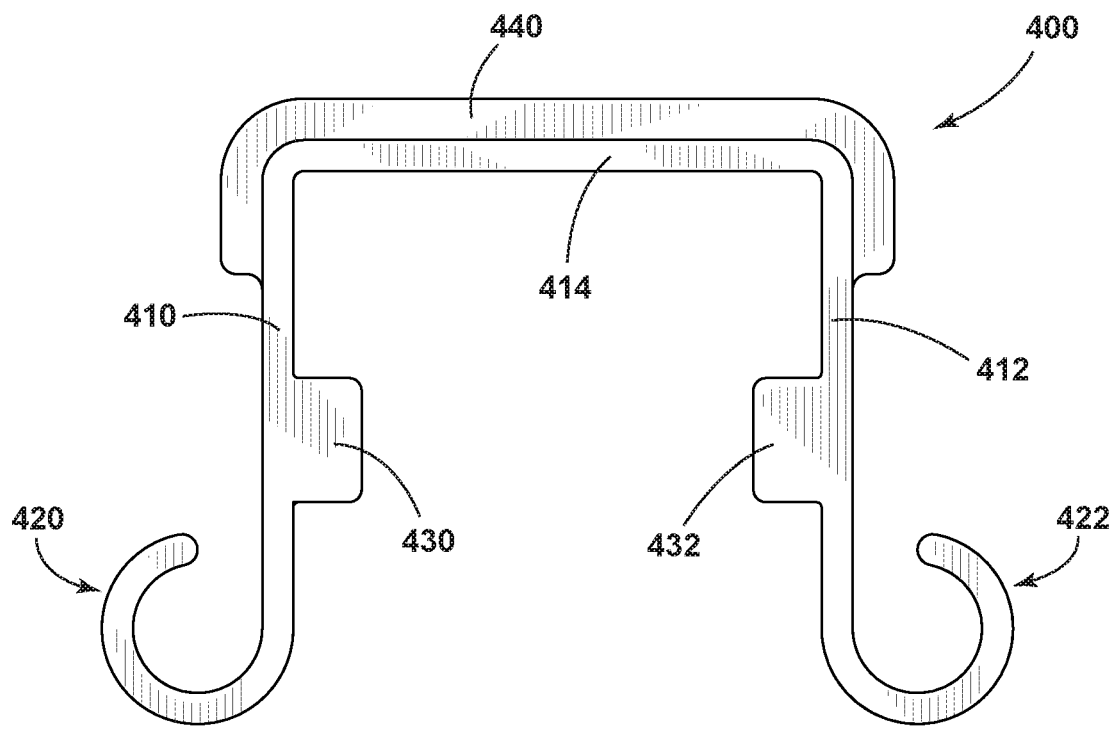
FIG. 28 is a front elevational view of the fourth embodiment.
Figure 29:
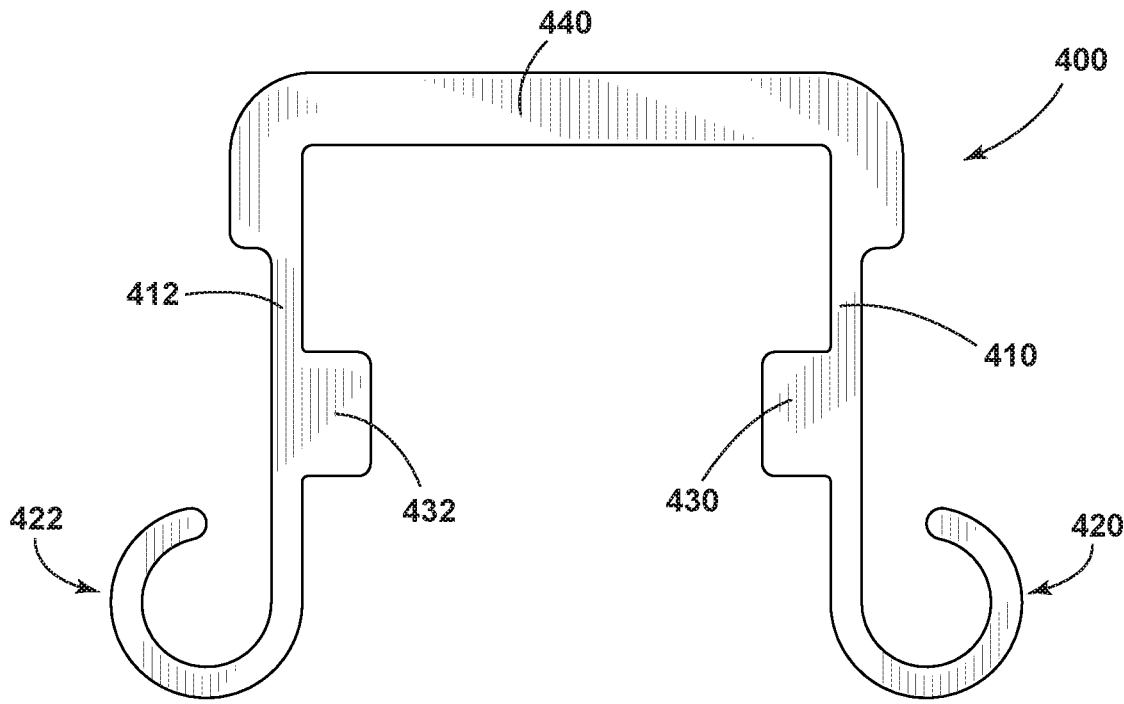
FIG. 29 is a rear elevational view of the fourth embodiment.
Figure 34:
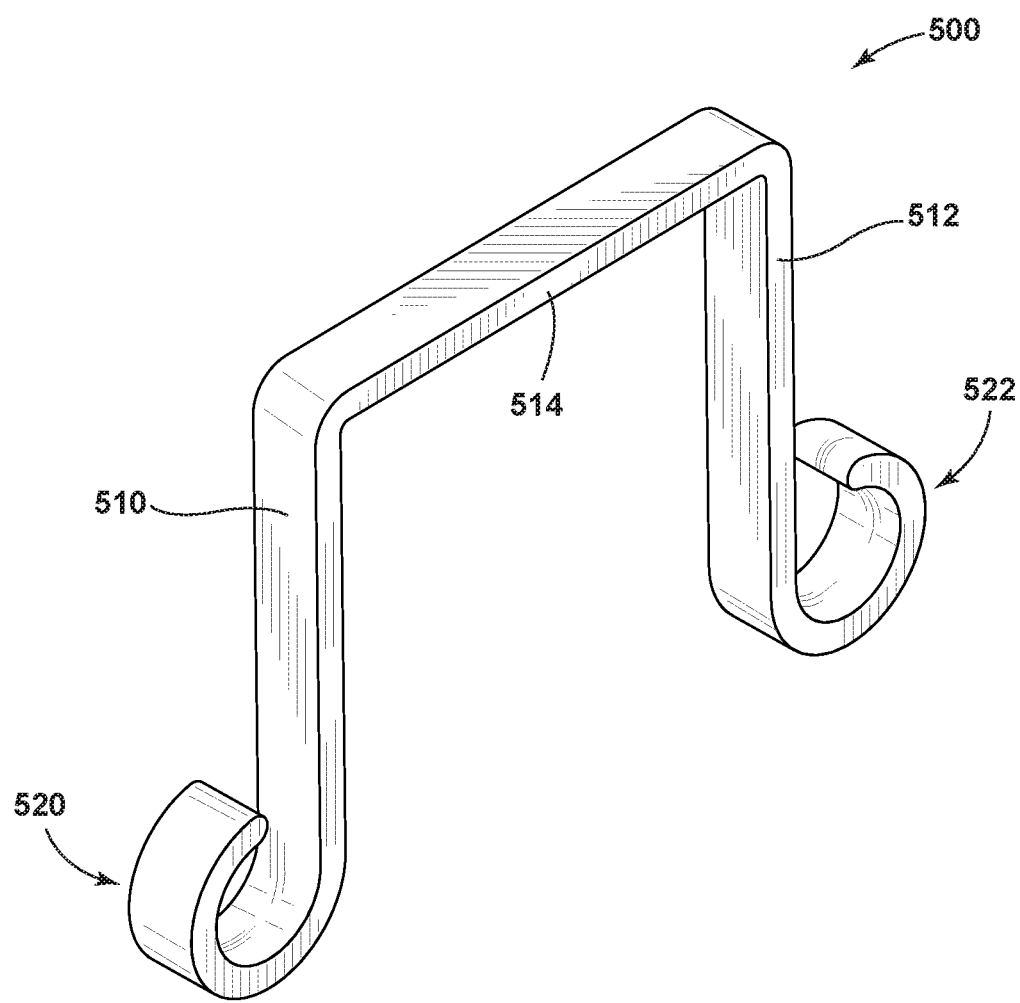
FIG. 34 is a front, top, left side perspective view of a chain holder showing a fifth embodiment of the design.
Figure 35:
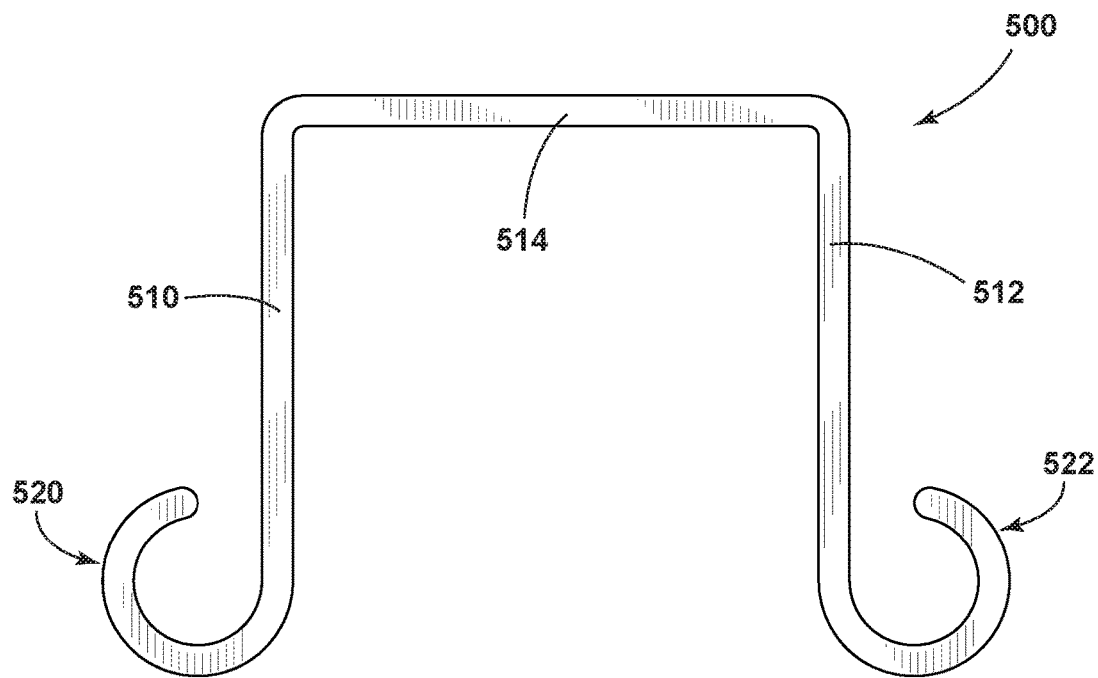
FIG. 35 is a front elevational view of the fifth embodiment.
Figure 36:
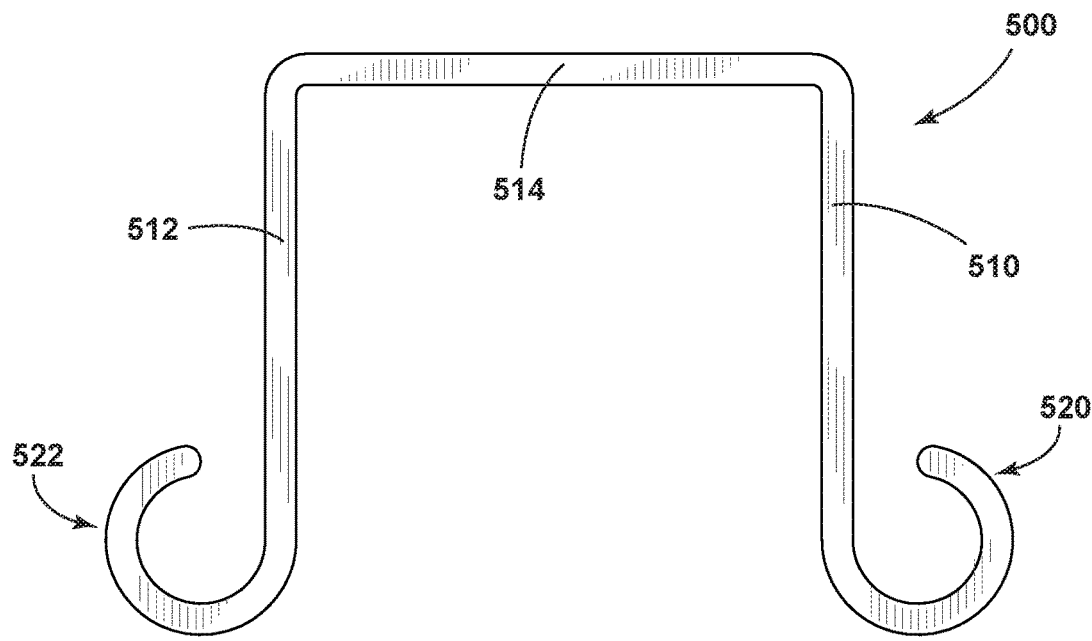
FIG. 36 is a rear elevational view of the fifth embodiment.
Figures 37, 38:
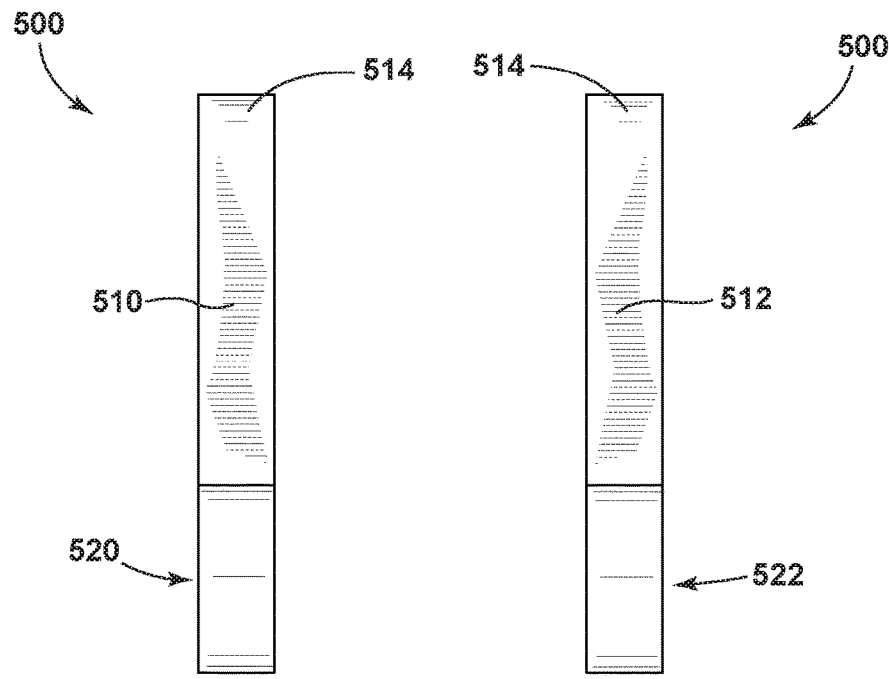
FIG. 37 is a left side view of the fifth embodiment.
FIG. 38 is a right side view of the fifth embodiment.
Figure 39:
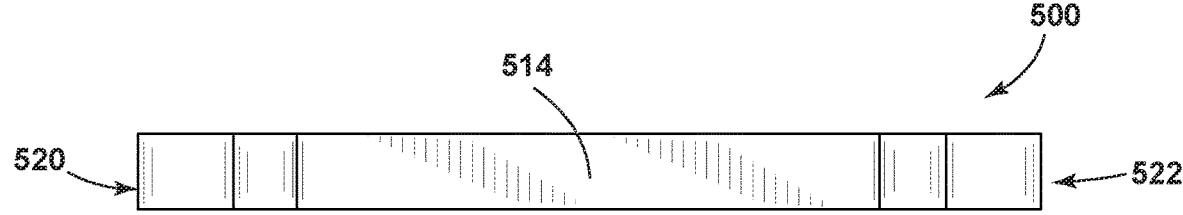
FIG. 39 is a top plan view of the fifth embodiment.
Figure 40:
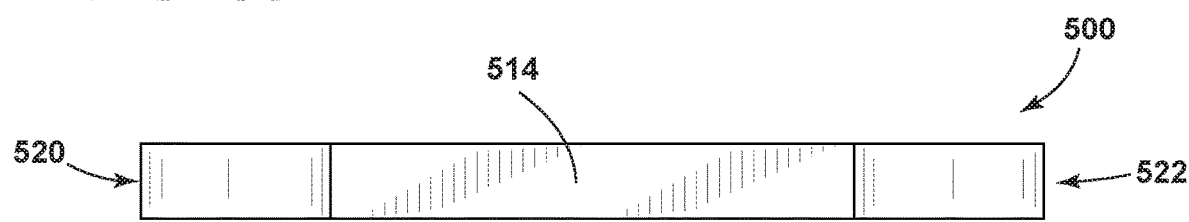
FIG. 40 is a bottom plan view of the fifth embodiment.
Figure 41:
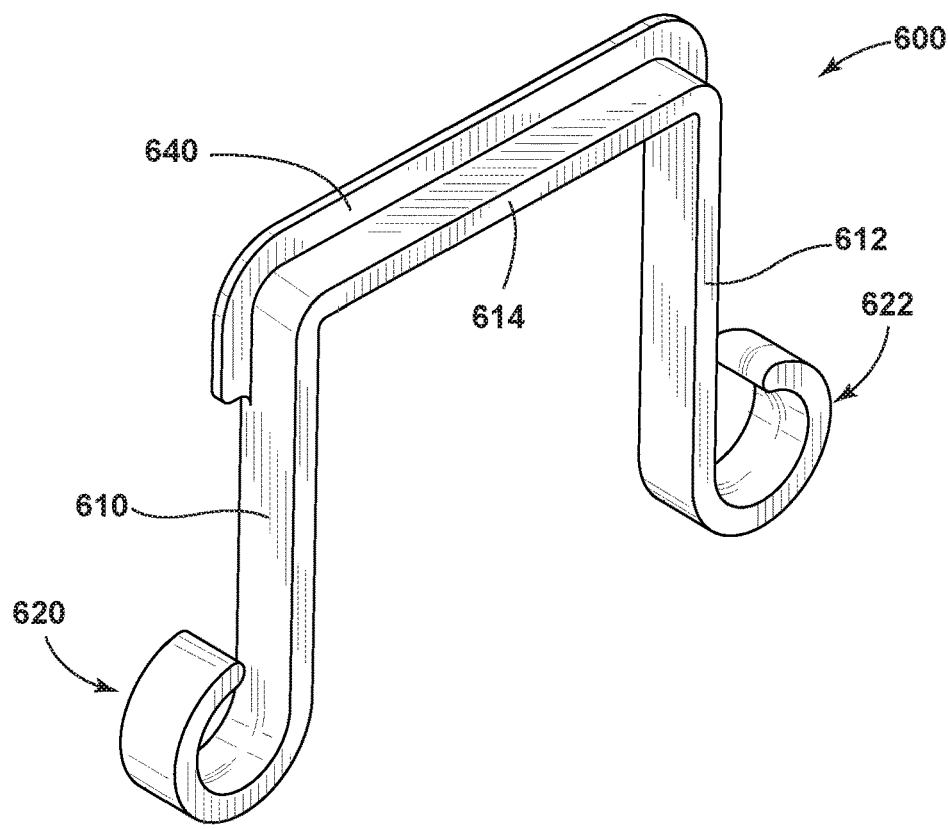
FIG. 41 is a front, top, left side perspective view of a sixth embodiment of a chain holder according to teachings of the present disclosure.
Figure 42:
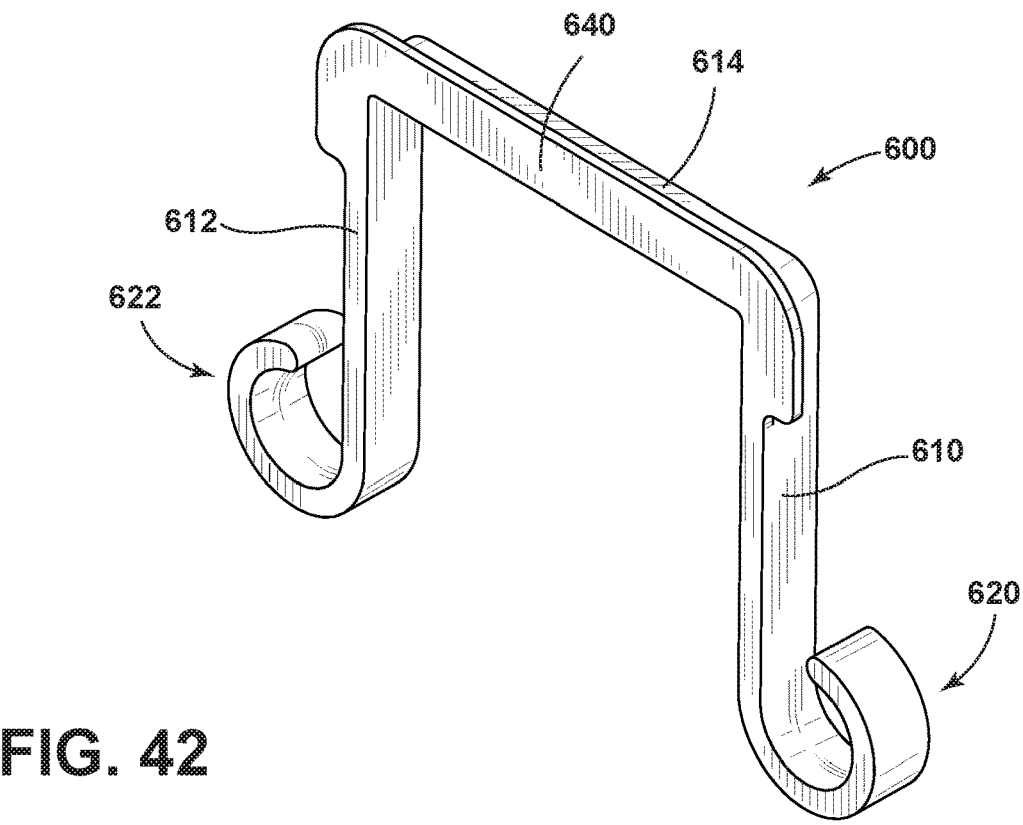
FIG. 42 is a rear, top, left side perspective view of the sixth embodiment.
Figure 43:
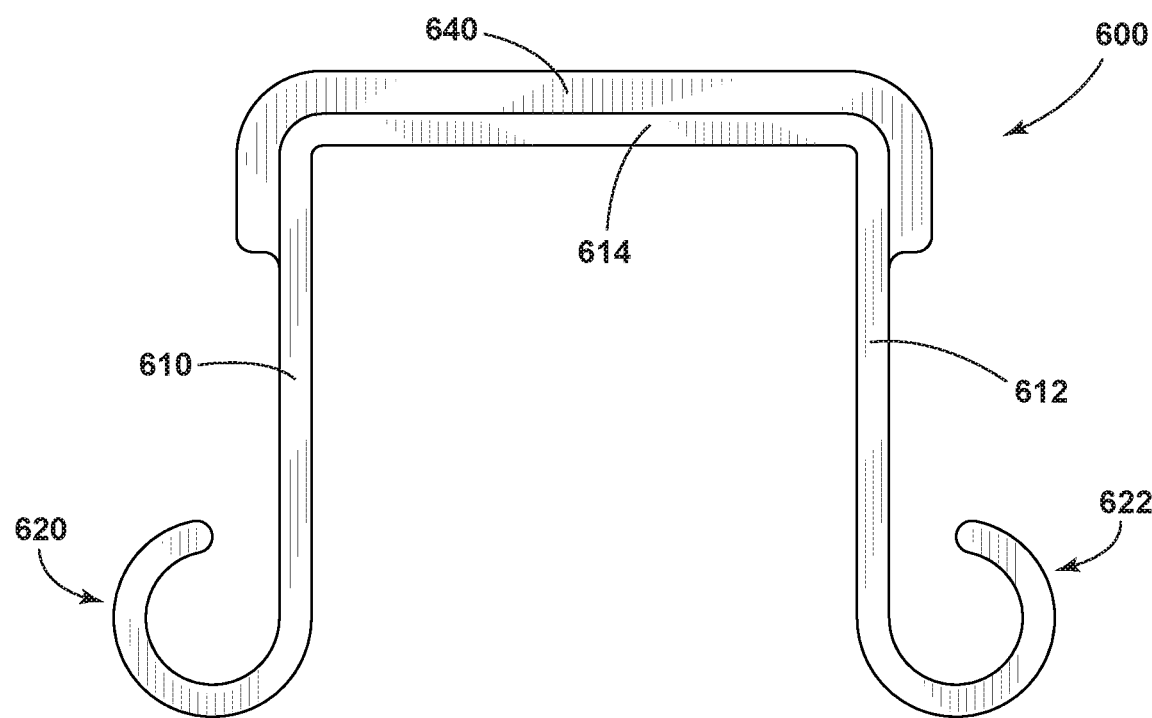
FIG. 43 is a front elevational view of the sixth embodiment.
Figure 44:
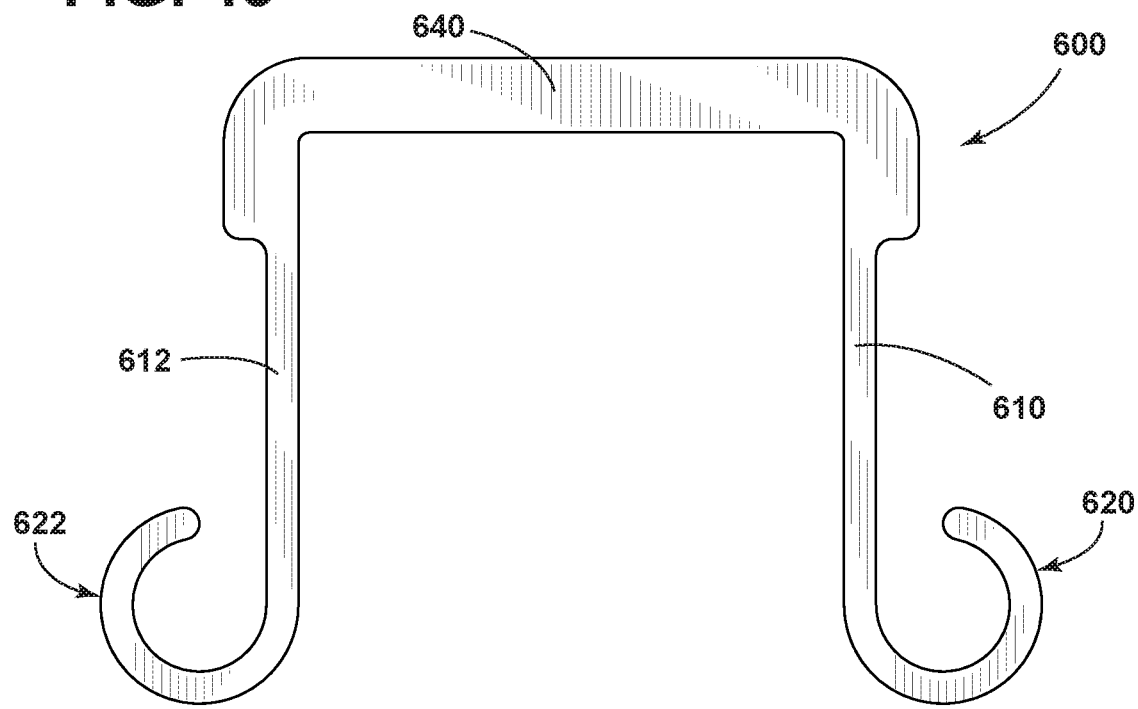
FIG. 44 is a rear elevational view of the sixth embodiment.
Figures 45, 46:
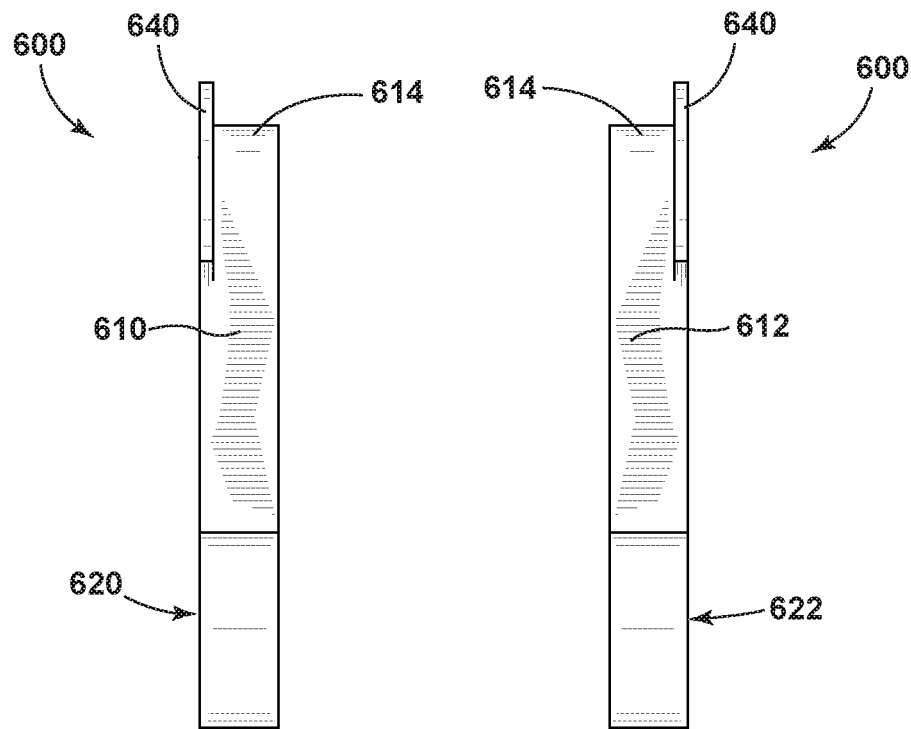
FIG. 45 is a left side view of the sixth embodiment.
FIG. 46 is a right side view of the sixth embodiment.
Figure 47:
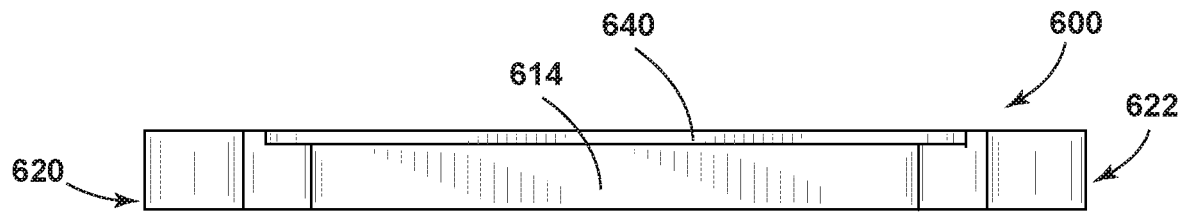
FIG. 47 is a top plan view of the sixth embodiment.
Figure 48:
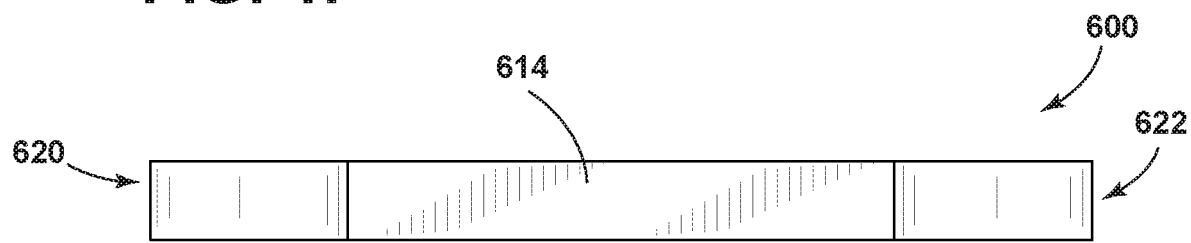
FIG. 48 is a bottom plan view of the sixth embodiment.
Figure 49:
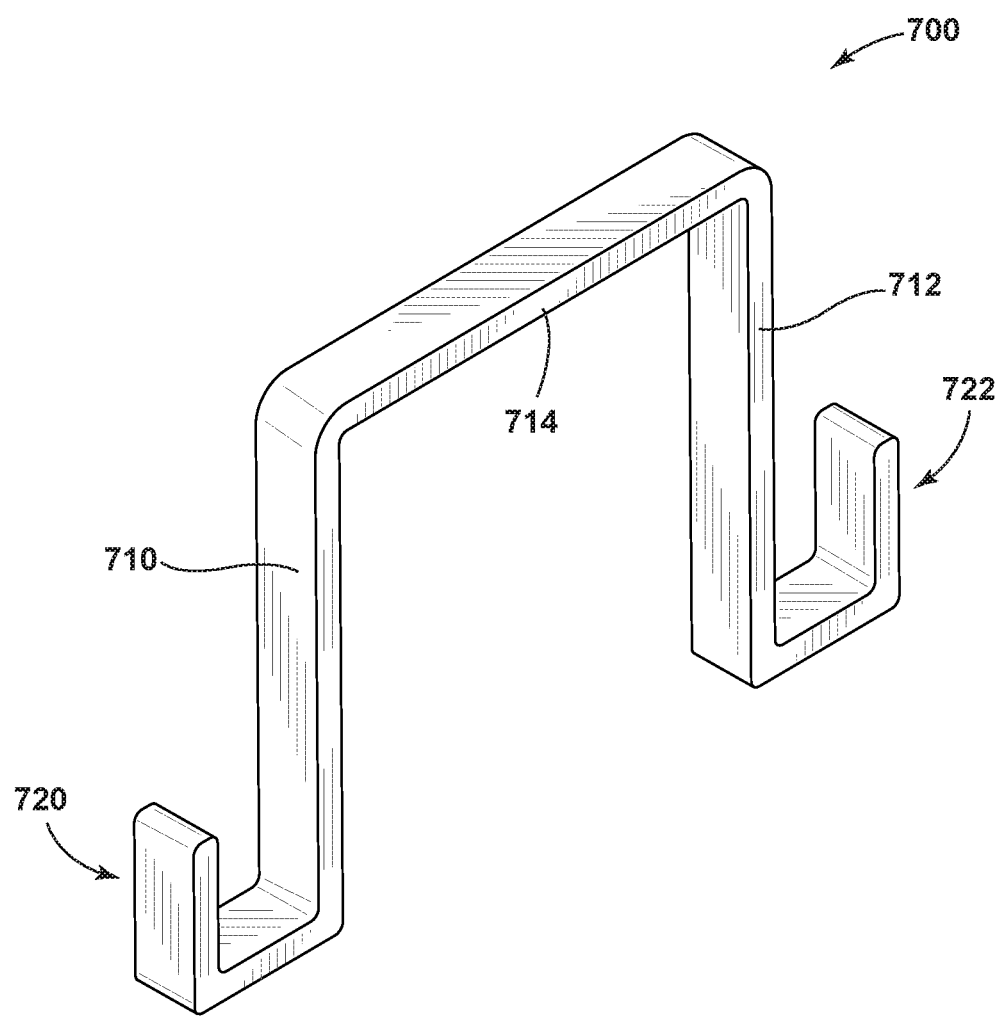
FIG. 49 is a front, top, left side perspective view of a seventh embodiment of a chain holder of the eighth embodiment.
Figure 50:
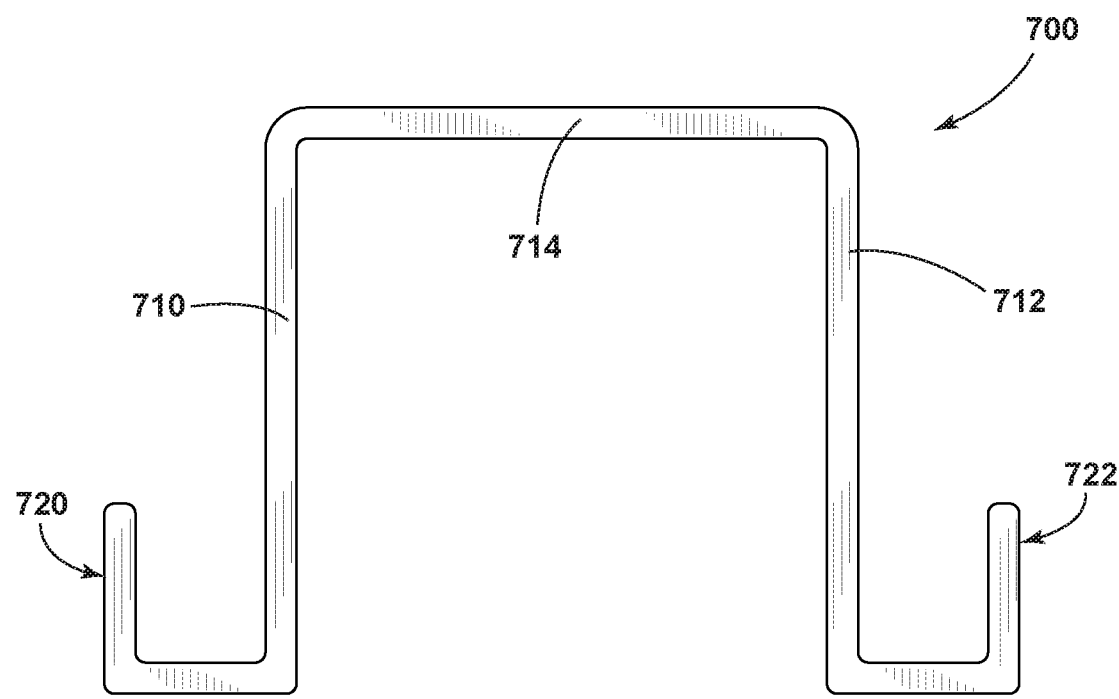
FIG. 50 is a front elevational view of the seventh embodiment.
Figure 51:
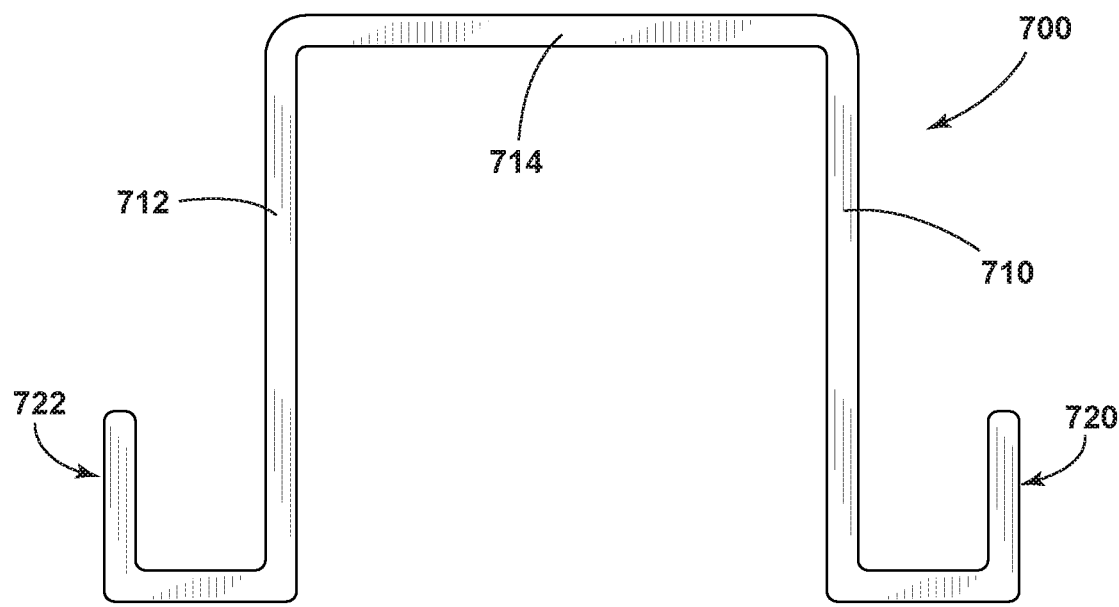
FIG. 51 is a rear elevational view of the seventh embodiment.
Figure 56:
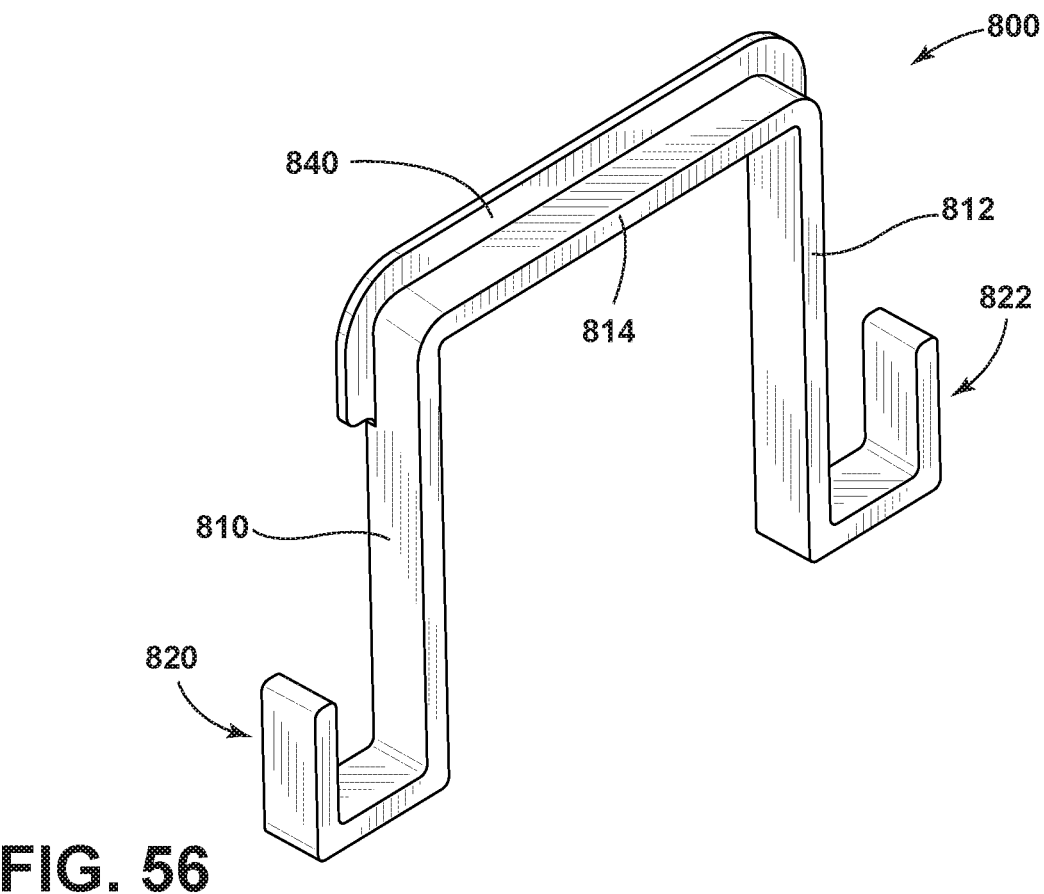
FIG. 56 is a front, top, left side perspective view of an eighth embodiment of a chain holder according to teachings of the present disclosure.
Figure 57:
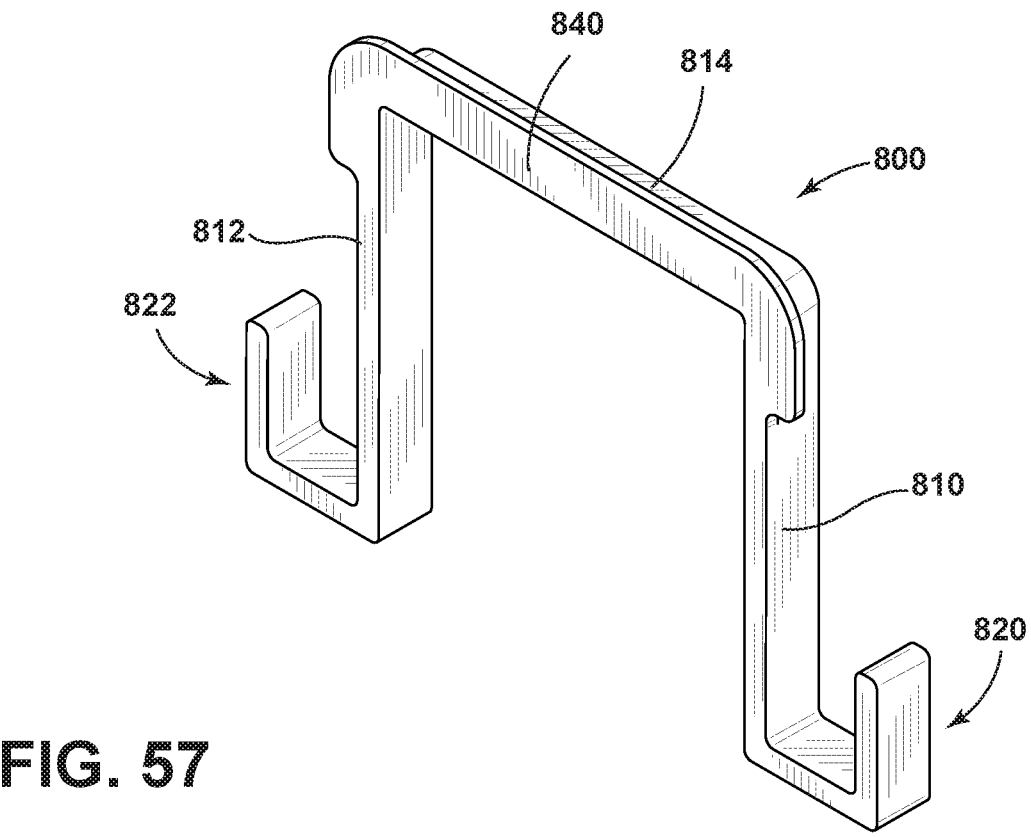
FIG. 57 is a rear, top, left side perspective view of the eighth embodiment.
Figure 58:
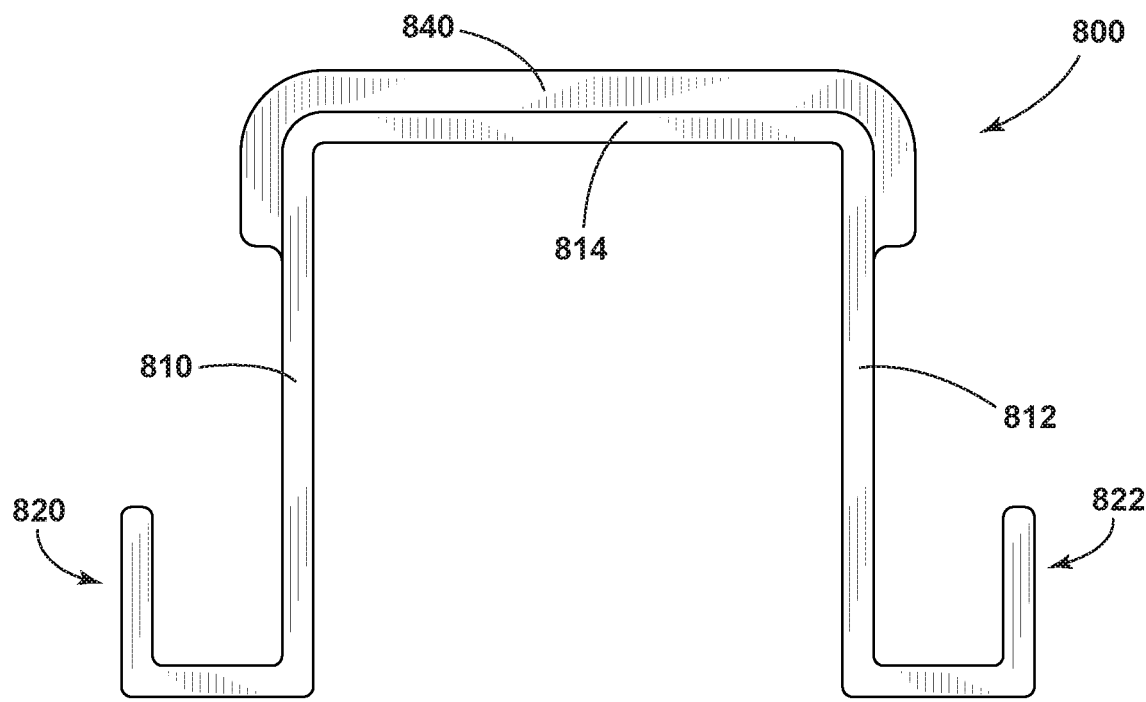
FIG. 58 is a front elevational view of the eighth embodiment.
Figure 59:
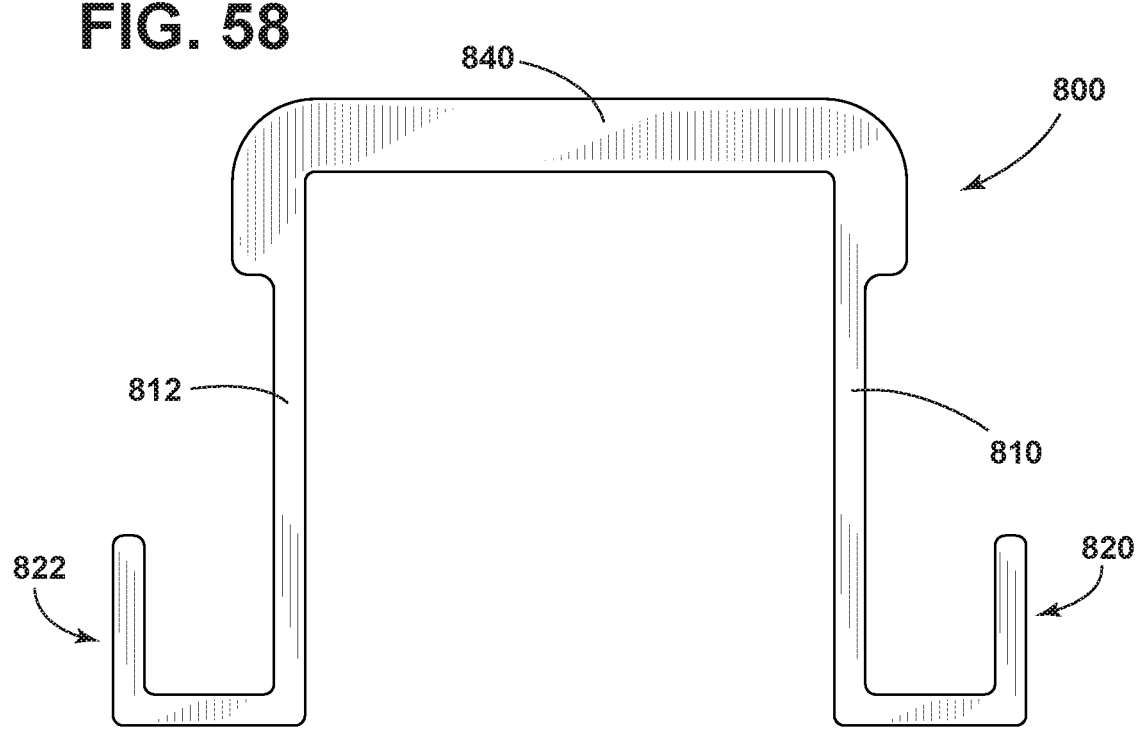
FIG. 59 is a rear elevational view of the eighth embodiment.
Figures 60, 61:
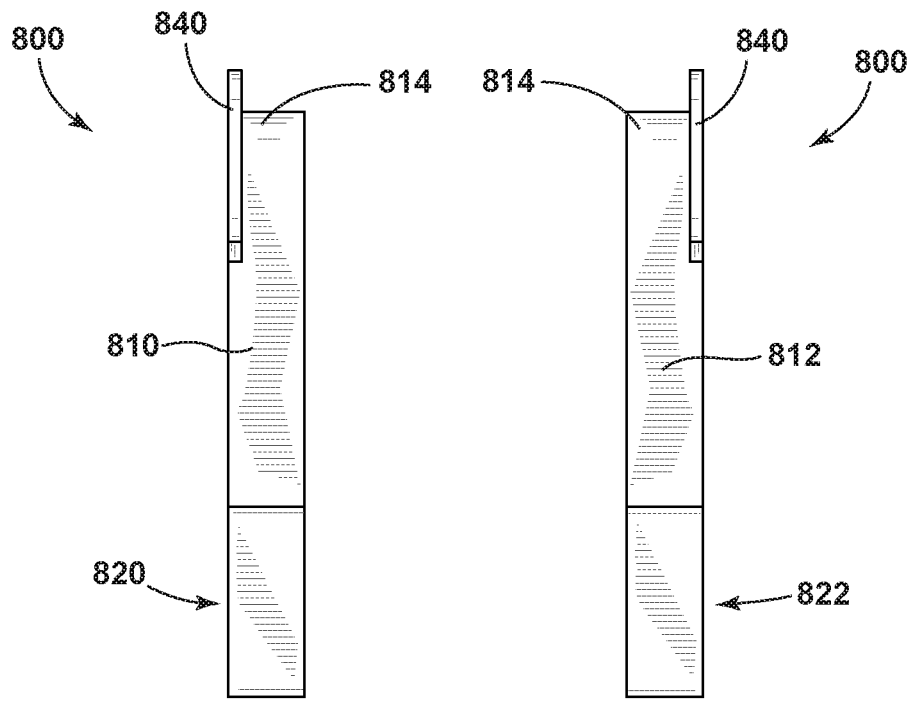
FIG. 60 is a left side view of the eighth embodiment.
FIG. 61 is a right side view of the eighth embodiment.
Figure 62:
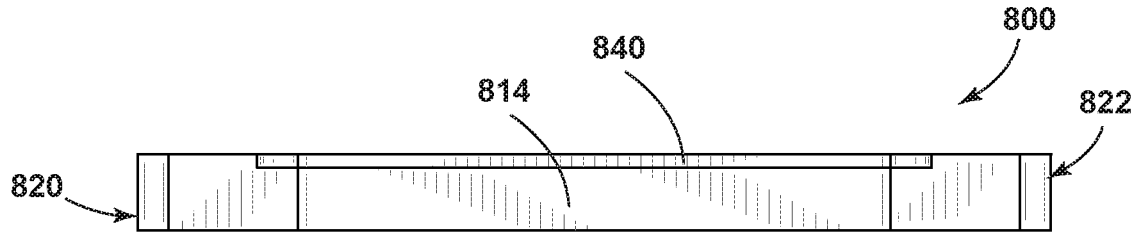
FIG. 62 is a top plan view of the eighth embodiment.
Figure 63:
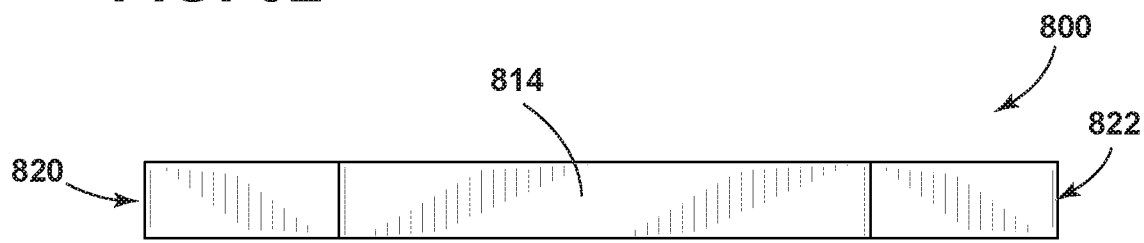
FIG. 63 is a bottom plan view of the eighth embodiment.
Figure 64:
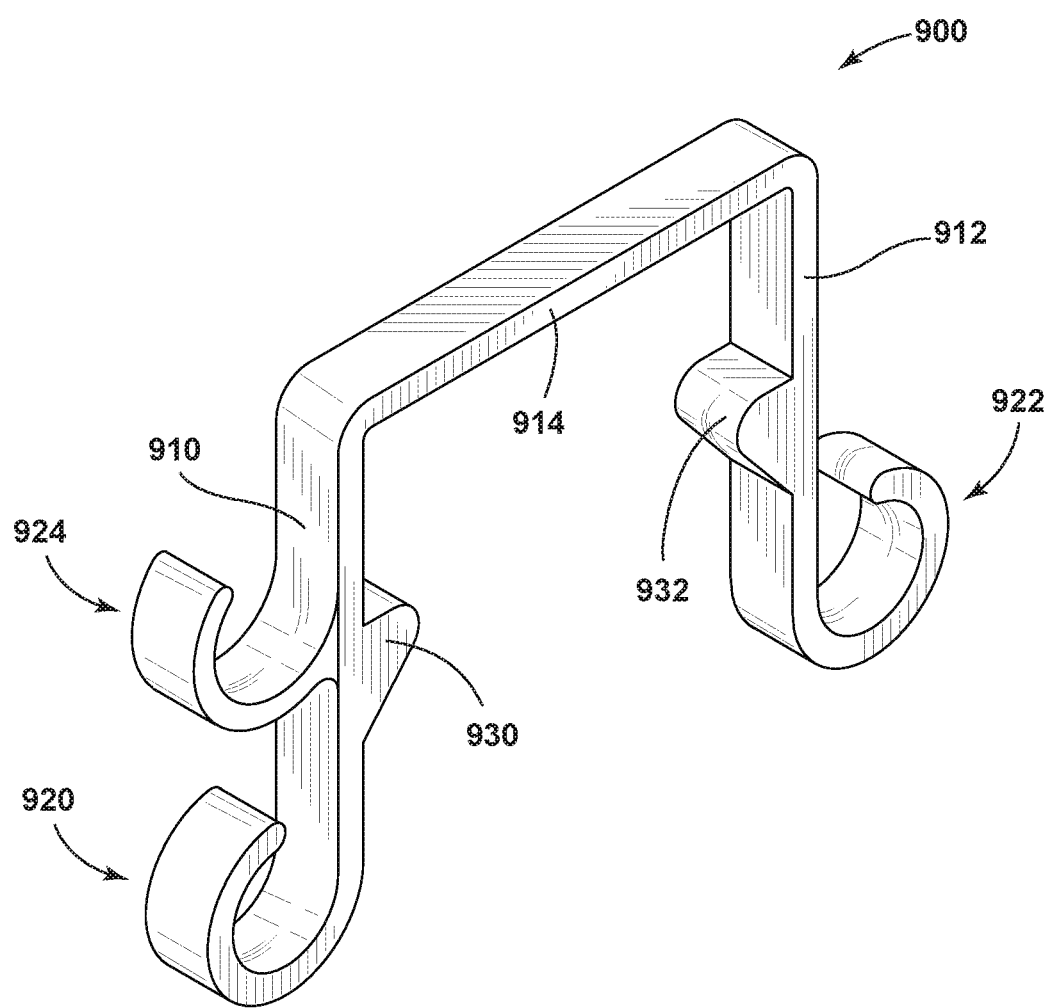
FIG. 64 is a front, top, left side perspective view of a ninth embodiment of a chain holder according to teachings of the present disclosure.
Figure 65:
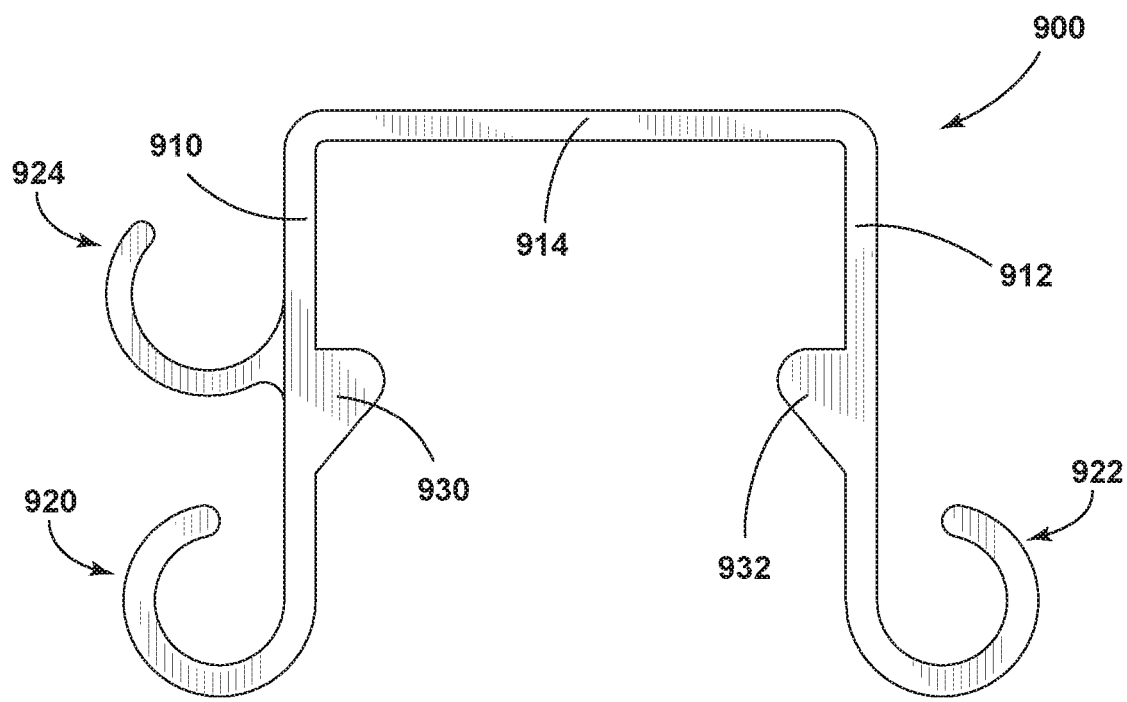
FIG. 65 is a front elevational view of the ninth embodiment.
Figure 66:
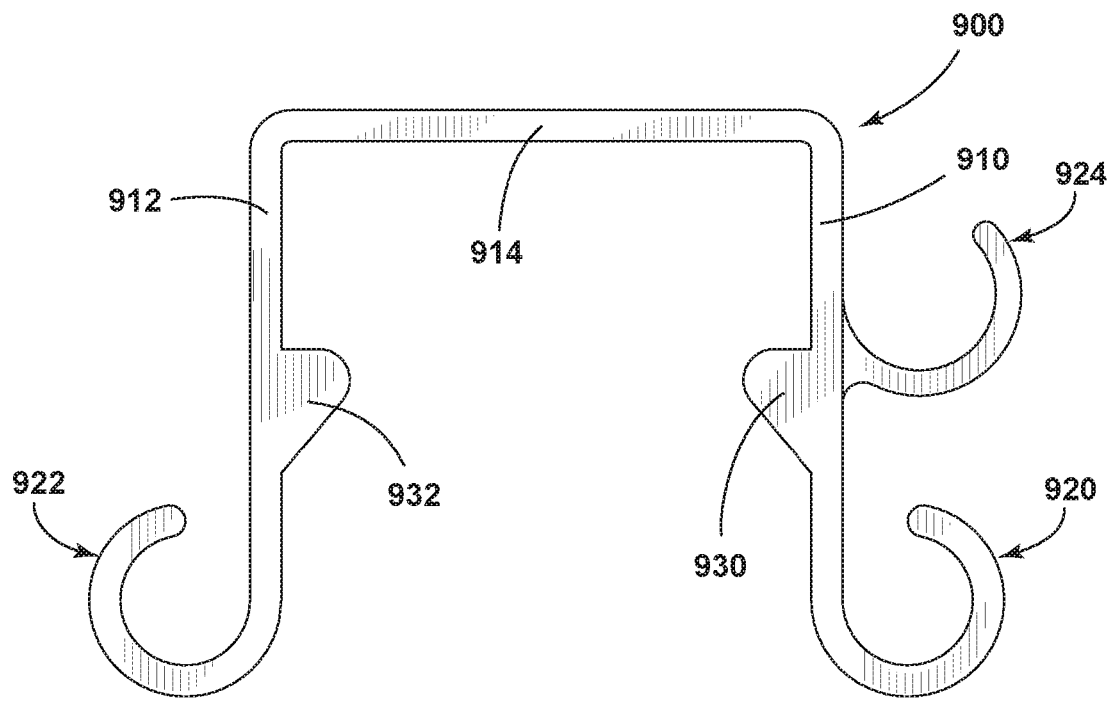
FIG. 66 is a rear elevational view of the ninth embodiment.
Figures 67, 68:
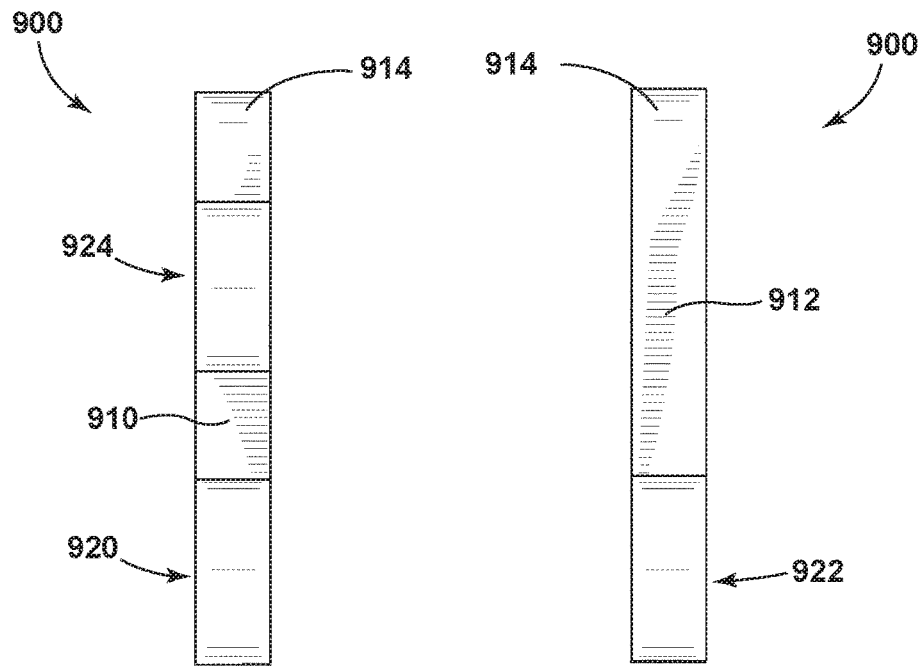
FIG. 67 is a left side view of the ninth embodiment.
FIG. 68 is a right side view of the ninth embodiment.
Figure 69:
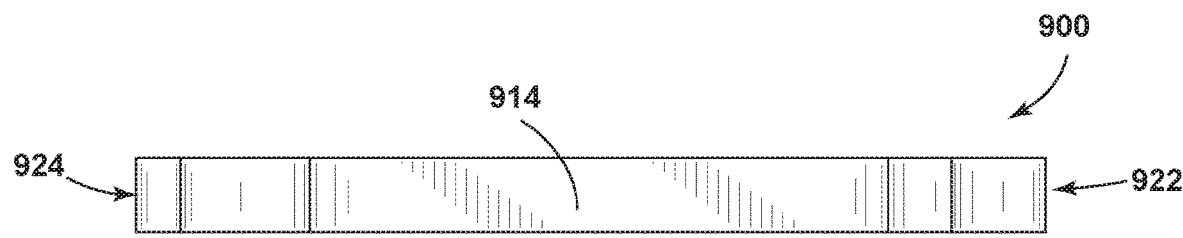
FIG. 69 is a top plan view of the ninth embodiment.
Figure 70:
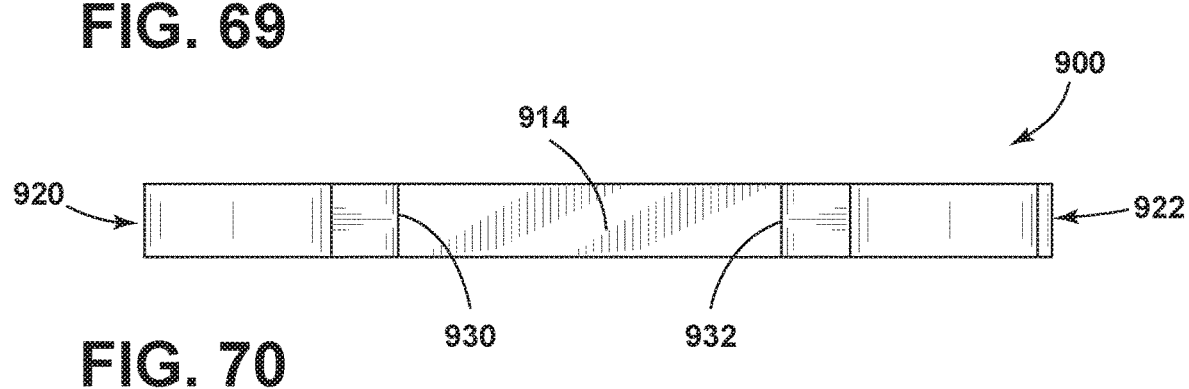
FIG. 70 is a bottom plan view of the ninth embodiment.

With embodiments, such as generally illustrated in FIG. 4, a chain holder 100 may include a first portion 110, a second portion 112, and/or a third portion 114. The third portion 114 may connect the first portion 110 with the second portion 112. The first portion 110 and the second portion 112 may be disposed substantially parallel with each other (e.g., vertically) and/or may be disposed substantially perpendicular to the third portion 114, which may be substantially horizontal. The first portion 110, the second portion 112, and the third portion 114 may include a generally U-shaped configuration that may open downward and/or that may be configured to receive at least a portion of a mounting component (e.g., mounting arm 90).

With embodiments, a chain holder 100 may include one or more hook portions, such as a first hook portion 120 and/or a second hook portion 122. The first hook portion 120 may extend from an end of the first portion 110 and/or a second hook portion 122 may extend from an end of the second portion 112. The first hook portion 120 and/or the second hook portion 122 may extend outward. A hook portion 120, 122 may include one or more of a variety of shapes, sizes, configurations, and/or materials. For example and without limitation, a hook portion (e.g., a first hook portion 120 and/or a second hook portion 122) may be generally annular and/or curved (see, e.g., FIGS. 4-48 and 64-70). Additionally or alternatively, a hook portion 120, 122 may include a generally rectangular configuration (see, e.g., FIGS. 49-63). A first hook portion 120 and a second hook portion 122 may or may not include the same or similar configurations.

In embodiments, a chain holder 100 may include one or more projections. For example and without limitation, a chain holder may include a first projection 130 that may extend inward from the first portion 110 (e.g., toward the second portion 112) and/or may include a second projection 132 that may extend inward from the second portion 112 (e.g., toward the first portion 110). A projection, such as the first projection 130 and/or the second projection 132, may be configured for connecting and/or securing a chain holder 100 with another component, such as a portion of a trailering assembly (e.g., a mounting arm 90). A projection 130, 132 may comprise or include one or more of a variety of shapes, sizes, configurations, and/or materials. For example and without limitation, a projection 130, 132 may have or include a generally triangular configuration that may include a substantially horizontal portion 134 (which may be configured to facilitate retention of the chain holder 100 to or with a component, such as a mounting arm 90) and/or a tapered portion 136 that may extend from an end of the substantially horizontal portion 134 toward the first portion 110 or the second portion 112 (which may facilitate sliding or positioning over a portion of such other component). As generally illustrated a portion transitioning from a tapered portion 136 to a horizontal portion 134 may include a segment with a curved or smooth transition (e.g., a curved corner/edge).

A substantially horizontal portion 134 may be disposed at a distance D (e.g., a vertical distance) from a third portion 114 of a chain holder 100 (see, e.g., FIG. 2). The distance D may correspond to a height of a trailering assembly component, such as a height 90H of a mounting arm 90. The distance D may, for example and without limitation, be about 1 inch, about 2 inches, about 2.75 inches, about 3 inches, about 4 inches, about 5 inches, and may be larger or smaller to accommodate a given application. If a chain holder 100 is connected with a trailering assembly component such as a mounting arm 90, the first portion 110 and/or the second portion 112 may initially deflect outward during connection. If connection continues, the first projection 130 and/or the second projection 132 may snap into engagement with the mounting arm 90, which may restrict movement of the chain holder 100 in at least one direction relative to the mounting arm component (e.g., a vertical/upward direction). The first portion 110 and/or the second portion 112 may restrict movement of the chain holder 100 in one or more other directions, such as lateral directions. A first projection 130 and a second projection 132 may be substantially aligned and/or parallel with each other. A first projection 130 and/or a second projection 132 may be disposed at least partially above hook portions 120, 122.

With embodiments, such as generally illustrated in FIGS. 1-11, 26-33, 41-48, and 56-63, a chain holder (e.g., chain holder 100) may include a flange 140 that may extend from the first portion 110, the second portion 112, and/or the third portion 14. A flange 140 may have or include one or more of a variety of shapes, sizes, configurations, and/or materials. For example and without limitation, a flange 140 may extend outward (e.g., laterally in a first direction) from the first portion 110, extend outward (e.g., laterally in a second, opposite direction) from the second portion 112, and/or extend outward (e.g., upward) from the third portion 114. A thickness 140T of a flange 140 may be less than thicknesses 110T, 112T, 114T of the first portion 110, the second portion 112, and the third portion 114, respectively, which may or may not be common or substantially the same. For example and without limitation, a thickness 140T of a flange 140 may be less than about half of, less than about 40% of, less than about 30% of, about 20% of, and/or may be smaller or larger relative to thicknesses 110T, 112T, 114T of the first portion 110, the second portion 112, and the third portion 114. A flange 140 may extend along substantially all and/or all of the third portion 114. Additionally or alternatively, a flange 140 may extend along only some of the first portion 110 and/or only some of the second portion 112. For example and without limitation, a flange 140 may extend along about 25% or less of a first portion 110 and/or a second portion 112. In embodiments, a flange 140 may include one or more rounded sections or corners 142. A flange 140 may extend from outer edges of the first portion 110, the second portion 112, and/or the third portion 114.

Embodiments of chain holders may include one or more of a variety of configurations. For example and without limitation, a first embodiment of a chain holder 100 is generally illustrated in FIGS. 1-11. A chain holder 100 may include a first portion 110, a second portion 112, a third portion 114, a first hook portion 120 that may be rounded or circular, a second hook portion 122 that may be rounded or circular, a first projection 130 that may be generally triangular, a second projection 132 that may be generally triangular, and/or a flange 140.

A second embodiment of a chain holder 200 is generally illustrated in FIGS. 12-18. A chain holder 200 may include a first portion 210, a second portion 212, a third portion 214, a first hook portion 220 that may be rounded or circular, a second hook portion 222 that may be rounded or circular, a first projection 230 that may be generally triangular, and/or a second projection 232 that may be generally triangular. A chain holder 200 may not include a flange.

A third embodiment of a chain holder 300 is generally illustrated in FIGS. 19-25. A chain holder 300 may include a first portion 310, a second portion 312, a third portion 314, a first hook portion 320 that may be rounded or circular, a second hook portion 322 that may be rounded or circular, a first projection 330 that may be generally rectangular, and/or a second projection 332 that may be generally rectangular. A chain holder 300 may not include a flange.

A fourth embodiment of a chain holder 400 is generally illustrated in FIGS. 26-33. A chain holder 400 may include a first portion 410, a second portion 412, a third portion 414, a first hook portion 420 that may be rounded or circular, a second hook portion 422 that may be rounded or circular, a first projection 430 that may be generally rectangular, a second projection 432 that may be generally rectangular, and/or a flange 440.

A fifth embodiment of a chain holder 500 is generally illustrated in FIGS. 34-40. A chain holder 500 may include a first portion 510, a second portion 512, a third portion 514, a first hook portion 520 that may be rounded or circular, and/or a second hook portion 522 that may be rounded or circular. A chain holder 500 may not include any projections and/or may not include a flange.

A sixth embodiment of a chain holder 600 is generally illustrated in FIGS. 41-48. A chain holder 600 may include a first portion 610, a second portion 612, a third portion 614, a first hook portion 620 that may be rounded or circular, a second hook portion 622 that may be rounded or circular, and/or a flange 640. A chain holder 600 may not include any projections.

A seventh embodiment of a chain holder 700 is generally illustrated in FIGS. 49-55. A chain holder 700 may include a first portion 710, a second portion 712, a third portion 714, a first hook portion 720 that may be rectangular, and/or a second hook portion 722 that may be rectangular. A chain holder 700 may not include any projections and/or may not include a flange.

An eighth embodiment of a chain holder 800 is generally illustrated in FIGS. 56-63. A chain holder 800 may include a first portion 810, a second portion 812, a third portion 814, a first hook portion 820 that may be rectangular, a second hook portion 822 that may be rectangular, and/or a flange 840. A chain holder 800 may not include any projections.

A ninth embodiment of a chain holder 900 is generally illustrated in FIGS. 64-70. A chain holder 900 may include a first portion 910, a second portion 912, a third portion 914, a first hook portion 920 that may be rounded or circular, a second hook portion 922 that may be rounded or circular, a third hook portion 924 that may be rounder or circular, a first projection 930 that may be generally triangular, and/or a second projection 932 that may be generally triangular. A chain holder 900 may or may not include a flange.

In embodiments, a third hook portion (e.g., third hook portion 924) may extend from a first portion 910 or a second portion 912. A third hook portion 924 may be offset from (e.g., disposed above) the first hook portion 920 and/or the second hook portion 922. With embodiments, a third hook portion 924 may be at least partially aligned with a projection. For example and without limitation, a third hook portion 924 may extend outward from a first portion 910 and a first projection 930 may extend inward from the first portion 910 such that the third hook portion 924 and the first projection 930 overlap, such as if viewed from a lateral direction. A third hook portion 924 may be disposed at least partially above (e.g., at a greater height and/or closer to a third portion 914, but not necessarily directly above) a projection 930, 932.

With embodiments, a third hook portion (e.g., third hook portion 924) may include a rounded and/or circular configuration. An angular extent of a third hook portion 924 may be less than an angular extent of a first hook portion 920 and/or second hook portion 922. For example and without limitation, an angular extent of a third hook portion 924 may be about 180 degrees and angular extents of a first hook portion 920 and a second hook portion 922, which may or may not be the same/common, may be about 270 degrees or greater. A smaller angular extent of a third hook portion 924 may provide a larger opening, relative to openings of first hook portion and second hook portion, that may be configured to receive a chain 84, an electrical member 86 (e.g., cable, wire, cord, etc.), and/or another component. A third hook portion 924 may be configured to retain and/or support an electrical member (see, e.g., electrical member 86 generally illustrated in FIG. 1) that may electrically connect a trailer 82 with a vehicle 80.

In embodiments, a chain holder (e.g., chain holders 100, 200, 300, 400, 500, 600, 700, 800, 900) may include one or more of a variety of materials. For example and without limitation, a chain holder may include one or more metals, plastics, polymers, and/or other materials. With embodiments, a chain holder may be configured as a monolithic component (e.g., formed as a single, unitary piece).

Various embodiments are described herein for various apparatuses, systems, and/or methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments.

Reference throughout the specification to "various embodiments," "with embodiments," "in embodiments," or "an embodiment," or the like, means that a particular feature, structure, or characteristic described in connection with the embodiment is included in at least one embodiment. Thus, appearances of the phrases "in various embodiments," "with embodiments," "in embodiments," or "an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment/example may be combined, in whole or in part, with the features, structures, functions, and/or characteristics of one or more other embodiments/examples without limitation given that such combination is not illogical or non-functional. Moreover, many modifications may be made to adapt a particular situation or material to the teachings of the present disclosure without departing from the scope thereof.

It should be understood that references to a single element are not necessarily so limited and may include one or more of such element. Any directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of embodiments.

Joinder references (e.g., attached, coupled, connected, and the like) are to be construed broadly and may include intermediate members between a connection of elements and relative movement between elements. As such, joinder references do not necessarily imply that two elements are directly connected/coupled and in fixed relation to each other. The use of "e.g." in the specification is to be construed broadly and is used to provide non-limiting examples of embodiments of the disclosure, and the disclosure is not limited to such examples. Uses of "and" and "or" are to be construed broadly (e.g., to be treated as "and/or"). For example and without limitation, uses of "and" do not necessarily require all elements or features listed, and uses of "or" are intended to be inclusive unless such a construction would be illogical.

It is intended that all matter contained in the above description or shown in the accompanying drawings shall be interpreted as illustrative only and not limiting. Changes in detail or structure may be made without departing from the present disclosure.

What is claimed is:

1. A chain holder, comprising:
   a first portion;
   a second portion;
   a third portion connecting the first portion with the second portion;
   a first hook portion extending from the first portion; and
   a second hook portion extending from the second portion;
   wherein the chain holder comprises a polymer; the chain holder includes a flange; the flange extends from the first portion, the second portion, and the third portion; and a thickness of the flange is less than thicknesses of the first portion, the second portion, and the third portion.

2. The chain holder of claim 1, wherein the first portion and the second portion are disposed substantially in parallel with each other.

3. The chain holder of claim 1, wherein the third portion is disposed substantially perpendicular to the first portion and the second portion.

4. The chain holder of claim 1, including a first projection and a second projection.

5. The chain holder of claim 4, wherein the first projection extends inward from the first portion, and the second projection extends inward from the second portion.

6. The chain holder of claim 5, wherein the first projection and the second projection are substantially aligned with each other.

7. The chain holder of claim 5, wherein at least one of the first projection and the second projection includes a triangular configuration.

8. The chain holder of claim 4, wherein a distance from the first projection to the third portion corresponds to a height of a trailer mounting arm or bar.

9. The chain holder of claim 4, wherein at least one of the first projection and the second projection includes a rectangular configuration.

10. The chain holder of claim 1, wherein at least one of the first hook portion and the second hook portion is curved and is configured to receive a trailer chain.

11. The chain holder of claim 1, wherein at least one of the first hook portion and the second hook portion is rectangular.

12. The chain holder of claim 1, wherein the flange extends outward from the first portion, the second portion, and the third portion.

13. The chain holder of claim 1, wherein the flange includes a pair of rounded corners and is substantially planar.

14. The chain holder of claim 1,
   wherein the first projection and the second projection are configured for connection with a trailer mounting arm or bar.

15. The chain holder of claim 1, including a third hook portion extending from the first portion.

16. The chain holder of claim 15, including a projection extending from the first portion.

17. The chain holder of claim 16, wherein the projection extends in a first direction, the third hook portion extends a second direction, the second direction is opposite the first direction, and the third hook portion and the projection are at least partially aligned with each other.

\* \* \* \* \*